(12) United States Patent
Sanchez et al.

(10) Patent No.: US 11,403,689 B2
(45) Date of Patent: Aug. 2, 2022

(54) METHODS AND SYSTEMS FOR OBTAINING AN INDICATION OF CARBON EMISSIONS BASED ON SHIPPING ROUTE AND TRANSPORTATION MODE PREDICTION

(71) Applicant: SHOPIFY INC., Ottawa (CA)

(72) Inventors: Ivan Sanchez, Ottawa (CA); Siavash Ghorbani, Toronto (CA); Michael Schneider, Ottawa (CA); Niklas Itänen, Ottawa (CA)

(73) Assignee: SHOPIFY INC., Ottawa (CA)

( * ) Notice: Subject to any disclaimer, the term of this patent is extended or adjusted under 35 U.S.C. 154(b) by 127 days.

(21) Appl. No.: 17/010,366

(22) Filed: Sep. 2, 2020

(65) Prior Publication Data

US 2022/0067751 A1    Mar. 3, 2022

(51) Int. Cl.
| | | |
|---|---|---|
| *G06Q 30/06* | (2012.01) | |
| *G06F 16/9535* | (2019.01) | |
| *G06Q 10/08* | (2012.01) | |
| *G06Q 20/40* | (2012.01) | |
| *G06Q 20/42* | (2012.01) | |
| *G06Q 30/00* | (2012.01) | |

(52) U.S. Cl.
CPC ..... *G06Q 30/0623* (2013.01); *G06F 16/9535* (2019.01); *G06Q 10/0833* (2013.01); *G06Q 10/0838* (2013.01); *G06Q 10/08355* (2013.01); *G06Q 20/40* (2013.01); *G06Q 20/42* (2013.01); *G06Q 30/018* (2013.01); *G06Q 30/0637* (2013.01); *G06Q 30/0639* (2013.01)

(58) Field of Classification Search
CPC ............. G06Q 30/018; G06Q 30/0637; G06Q 30/0639; G06Q 30/0623; G06Q 20/42; G06Q 20/40; G06Q 10/0833; G06Q 10/08355; G06Q 10/0838; G06F 16/9535
USPC ....................................... 705/26.61
See application file for complete search history.

(56) References Cited

U.S. PATENT DOCUMENTS

| | | | |
|---|---|---|---|
| 11,144,868 B1 * | 10/2021 | McBride ............ | G06Q 10/0834 |
| 2011/0065420 A1 * | 3/2011 | Reyes ..................... | G06F 21/41 |
| | | | 455/411 |

(Continued)

FOREIGN PATENT DOCUMENTS

| | | | | |
|---|---|---|---|---|
| CN | 107730425 A | * | 2/2018 | ............ G06Q 50/26 |
| CN | 112216132 A | * | 1/2021 | ............ G06Q 20/10 |

OTHER PUBLICATIONS

Messers Mohamed Ali Kammoun; Sadok Turki & Rezg, Nidhal, "Optimization of Flight Rescheduling Problem under Carbon Tax" Published in Sustainability 12.14: 5576. MDPI AG. Publication date: Jul. 15, 2020, retrieved from Dialog.*

*Primary Examiner* — Yogesh C Garg

(57) ABSTRACT

A customer may wish to purchase products with a lower associated carbon footprint when shipped, or may wish to know the cost associated with offsetting a product's carbon footprint in order to make informed decisions, while browsing and making purchases online. The computer is faced with the computational challenge of trying to determine a value indicative of the carbon emissions associated with shipping a package, before the package has even shipped. The computation may need to be performed during interactive scenarios, such as while browsing. A system and method are provided in order to present a customer with a carbon emissions indication relating to the shipment of a product without disrupting typical online activity.

21 Claims, 17 Drawing Sheets

(56) References Cited

U.S. PATENT DOCUMENTS

2016/0125515 A1* 5/2016 Josefiak .............. G06Q 10/083
                                                    705/27.1
2017/0351978 A1* 12/2017 Bellowe ................ G06Q 50/01
2020/0202377 A1   6/2020 Yacoub et al.

* cited by examiner

Tracking Identifier = 1Z28W7772027341888 ; Carrier = UPS

| Event 406 | Location 408 | Date/Time Stamp 410 |
|---|---|---|
| Pickup | San Francisco, USA | Apr 20, 2020 10 AM |
| Arrive at San Francisco Depot | San Francisco, USA | Apr 20, 2020 1 PM |
| Depart San Francisco Depot | San Francisco, USA | Apr 20, 2020 6 PM |
| Arrive Los Angeles Depot | Los Angeles, USA | Apr 20, 2020 11:30 PM |
| Depart Los Angeles Depot | Los Angeles, USA | Apr 21, 2020 5:45 AM |
| Arrive Toronto Depot | Toronto, Canada | Apr 21, 2020 4 PM |
| Arrive Customs | Toronto, Canada | Apr 21, 2020 5 PM |
| Clear Customs | Toronto, Canada | Apr 21, 2020 10 PM |
| Depart Toronto Depot | Toronto, Canada | Apr 22, 2020 8 AM |
| Arrive Ottawa Depot | Ottawa, Canada | Apr 22, 2020 2 PM |
| Out for delivery | Ottawa, Canada | Apr 23, 2020 9 AM |
| Delivered | Ottawa, Canada | Apr 23, 2020 10:30 AM |

FIG. 5

Carrier = FedEx; Mail Class = Priority (Express); Package Weight < 30 pounds — 700

| Event 1 702 | Event 2 704 | Distance 706 | Average Transit Time 708 | Predicted Transportation Mode 710 |
|---|---|---|---|---|
| Pick-up | Arrive at San Francisco Depot | Less than 60 miles | 1.2 hours | Pickup / Delivery Truck |
| Pick-up | Arrive at San Jose Depot | Less than 60 miles | 1.6 hours | Pickup / Delivery Truck |
| ... | ... | ... | ... | ... |
| Depart San Francisco Depot | Arrive at Los Angeles Depot | 380 miles | 6.3 hours | Transport Truck |
| Depart Los Angeles Depot | Arrive at Toronto Depot | 2500 miles | 7.8 hours | Air |
| ... | ... | ... | ... | ... |

Carrier = FedEx; Mail Class = Economy (Non-Express); Package Weight < 30 pounds — 812

| Event 1 802 | Event 2 804 | Distance 806 | Average Transit Time 808 | Predicted Transportation Mode 810 |
|---|---|---|---|---|
| Pick-up | Arrive at San Francisco Depot | Less than 60 miles | 3.2 hours | Pickup / Delivery Truck |
| Pick-up | Arrive at San Jose Depot | Less than 60 miles | 2.6 hours | Pickup / Delivery Truck |
| ... | ... | ... | ... | ... |
| Depart San Francisco Depot | Arrive at Los Angeles Depot | 380 miles | 8.3 hours | Transport Truck |
| Depart Los Angeles Depot | Arrive at Toronto Depot | 2500 miles | 3.3 days | Train |
| ... | ... | ... | ... | ... |

FIG. 9

Merchant Jane's Accessory Store — 910

| Product ID 902 | Selected shipping service level at checkout 904 | Delivery Address 906 | Predicted Carrier 908 |
|---|---|---|---|
| 0001 ("Pineapple Keychain") | Regular | USA | USPS |
| | | Canada | FedEx |
| | Expedited | USA | FedEx |
| | | Canada | FedEx |
| 0002 ("Banana Keychain") | ... | | |
| ... | | | |

Carrier = FedEx; Mail Class = Priority (Express); Package Weight < 30 pounds

| Shipping Route Segment 1002 | Distance 1004 | Transportation Mode 1006 |
|---|---|---|
| Pick-up to Arrival at San Francisco Depot | 48 miles | Pickup / Delivery Truck |
| Depart San Francisco Depot to Arrival at Los Angeles Depot | 380 miles | Transport Truck |
| Depart Los Angeles Depot to Arrival at Toronto Depot | 2500 miles | Air |
| Depart Toronto Depot to Delivery | 15 miles | Pickup / Delivery Truck |

FIG. 11

| Mode of Transportation 1102 | Weight of Package 1104 | Carbon Offset Amount 1106 |
|---|---|---|
| Airplane | Less than 30 pounds | 0.13 cents / mile |
|  | More than 30 pounds | 0.2 cents / mile |
| Transport Truck | Less than 30 pounds | 0.04 cents / mile |
|  | More than 30 pounds | 0.06 cents / mile |
| Pickup / Delivery Truck | Less than 30 pounds | 0.07 cents / mile |
|  | More than 30 pounds | 0.09 cents / mile |
| Train | Less than 30 pounds | 0.08 cents / mile |
|  | More than 30 pounds | 0.1 cents / mile |
| ... |  |  |

FIG. 12

METHODS AND SYSTEMS FOR OBTAINING AN INDICATION OF CARBON EMISSIONS BASED ON SHIPPING ROUTE AND TRANSPORTATION MODE PREDICTION

FIELD

The present application relates to a computer obtaining an indication of carbon emissions associated with shipping a package, and in particular to performing the computer operations during interactive scenarios in which there are time constraints to provide such indications.

BACKGROUND

An e-commerce platform can facilitate purchase of a product that is located physically far away from the customer. The purchased product is packaged and shipped to the customer by a carrier.

A package being shipped has carbon emissions associated with the shipping, which may be referred to as a carbon footprint. The carbon footprint may vary based on the distance between the package's origin location and the destination location of the customer, as well as the mode of transportation used to transport the package.

The customer may wish to purchase products with a lower associated carbon footprint when shipped, or may wish to know the cost associated with offsetting a product's carbon footprint, in order to make informed decisions while browsing and making purchases from an online store.

SUMMARY

A value indicative of the carbon emissions associated with shipping a package will be referred to as a carbon emission value or carbon offset value. The computer implementing the e-commerce transaction is faced with the computational challenge of trying to predict the carbon offset value for shipping the package, before the package has even shipped, in order to provide the customer with an indication of the carbon emissions associated with their package during interactive scenarios, such as while browsing or checking out in a merchant's online store. The computer implementing the e-commerce transaction must be able to predict, within particular timing constraints, the carbon offset value for shipping the package. The timing constraints are such that an indication of the carbon emissions is to be provided to the customer without disrupting typical online activity in a merchant's online store, such as browsing product pages or checking out. For example, at the time of checkout, the computer might not know the carrier that will be used by the merchant to ship the package, let alone the actual shipping route and/or mode(s) of transportation. There may be many potential carriers, modes of transportation, shipping routes, etc. that may be used to deliver the package. Other factors often also vary on a purchase-by-purchase basis, such as the delivery address (also known as the destination address), size and/or weight of the package, the shipping service level selected (e.g. expedited shipping versus non-expedited shipping), etc.

In some embodiments, systems and methods are disclosed in which a computer implements calculation of a carbon offset value associated with shipping one or more products being viewed and/or purchased online via a computer network.

In some embodiments, a computer model is generated that predicts the route and mode(s) of transportation that will be used when the package travels from its origin to its destination. A carbon offset value is then computed based on the prediction, and a carbon emission indication is presented on a user interface of the user's device. In some embodiments, the carbon emission indication may be the carbon offset value itself or another value based on the carbon offset value. In some embodiments, the carbon emission indication may be a monetary value. In some embodiments, the carbon emission indication may be or include a message that is determined based on the carbon offset value, e.g. the message "A Green Choice" may be displayed when the carbon offset value is below a particular threshold.

In one embodiment, there is provided a computer-implemented method that includes receiving, from a user device over a network, a request for a web resource associated with a product in an online store and replying to the request. The replying to the request may include obtaining a delivery address associated with the user device, obtaining an origin address associated with the product, and identifying a shipping route for shipping the product from the origin address to the delivery address. The shipping route may have at least one shipping route segment. The replying may further include determining a respective transportation mode and distance for each shipping route segment of the shipping route, and obtaining a carbon emission indication based on a respective carbon emission segment value for each shipping route segment of the shipping route. The respective carbon emission segment value for a given shipping route segment may be based on the transportation mode and the distance associated with the given shipping route segment. The replying may further include generating the web resource, the web resource including the carbon emission indication, and transmitting the web resource over the network for display on the user device.

A system is also disclosed that is configured to perform the methods disclosed herein. For example, the system may include a network interface to receive the request for the web resource and transmit the web resource, and at least one processor to directly perform (or instruct the system to perform) the method steps.

In another embodiment, there is provided a computer-readable medium having stored thereon computer-executable instructions that, when executed by a computer, cause the computer to perform operations of the methods described above.

BRIEF DESCRIPTION OF THE DRAWINGS

Embodiments will be described, by way of example only, with reference to the accompanying figures wherein:

FIG. 2 illustrates a home page of an administrator, according to one embodiment;

FIG. 5 illustrates an example of a shipping record for a previously shipped package;

FIGS. 8 to 9 illustrate package tracking models according to various embodiments;

FIG. 10 illustrates an example of a model used for mapping different products and/or conditions to a predicted carrier for products sold in a merchant's online store;

FIG. 11 illustrates an example of a model for a predicted carrier to predict a mode of transportation used to ship a package for each segment of a predicted shipping route;

FIG. 12 illustrates an example of a model including an associated carbon offset rate for a particular condition associated with shipping a package;

DETAILED DESCRIPTION

For illustrative purposes, specific example embodiments will now be explained in greater detail below in conjunction with the figures.

Example E-Commerce Platform

The methods disclosed herein may be performed in relation to a commerce platform, which will be referred to herein as an e-commerce platform. Therefore, an example of an e-commerce platform will be described.

Figure 1:
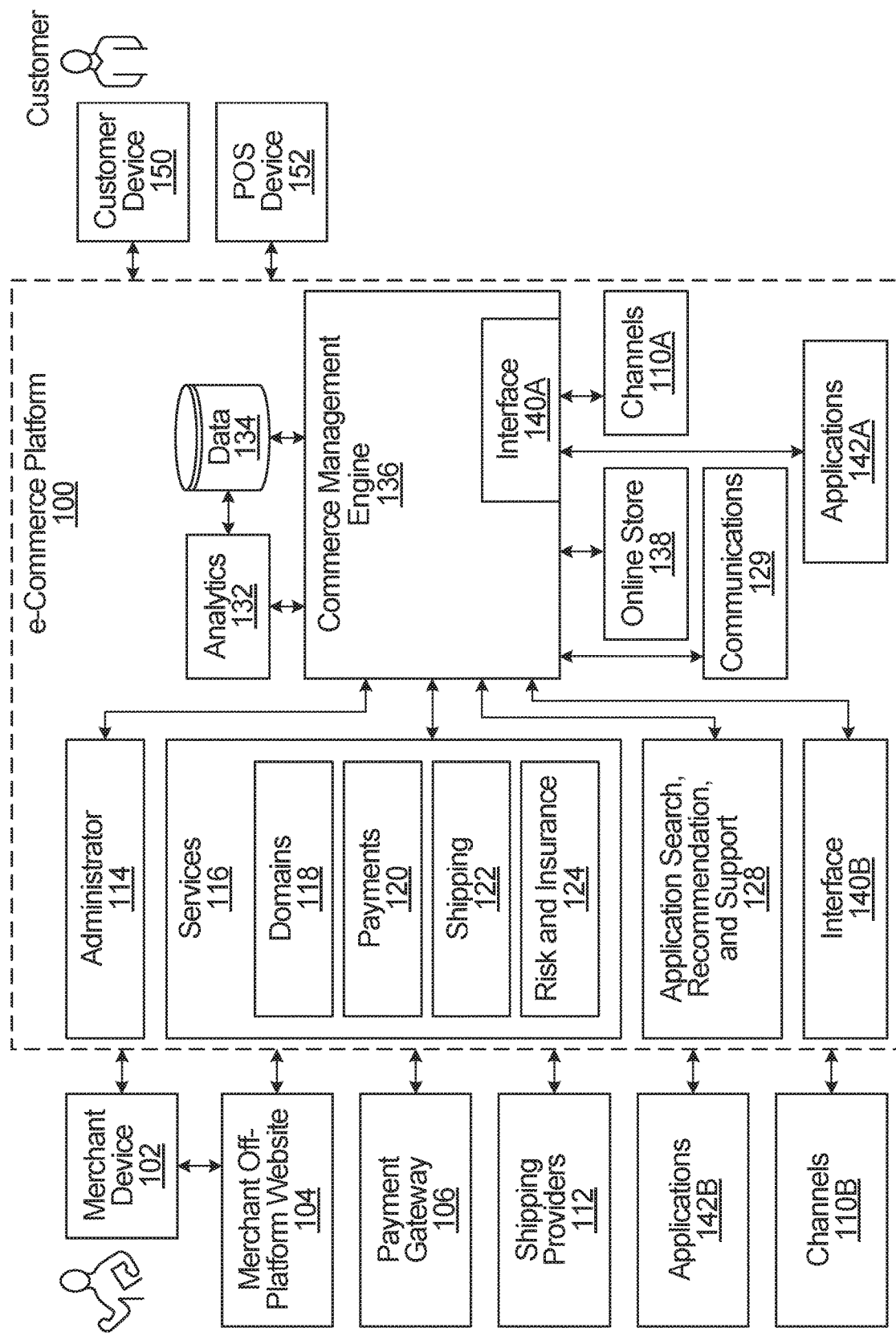
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
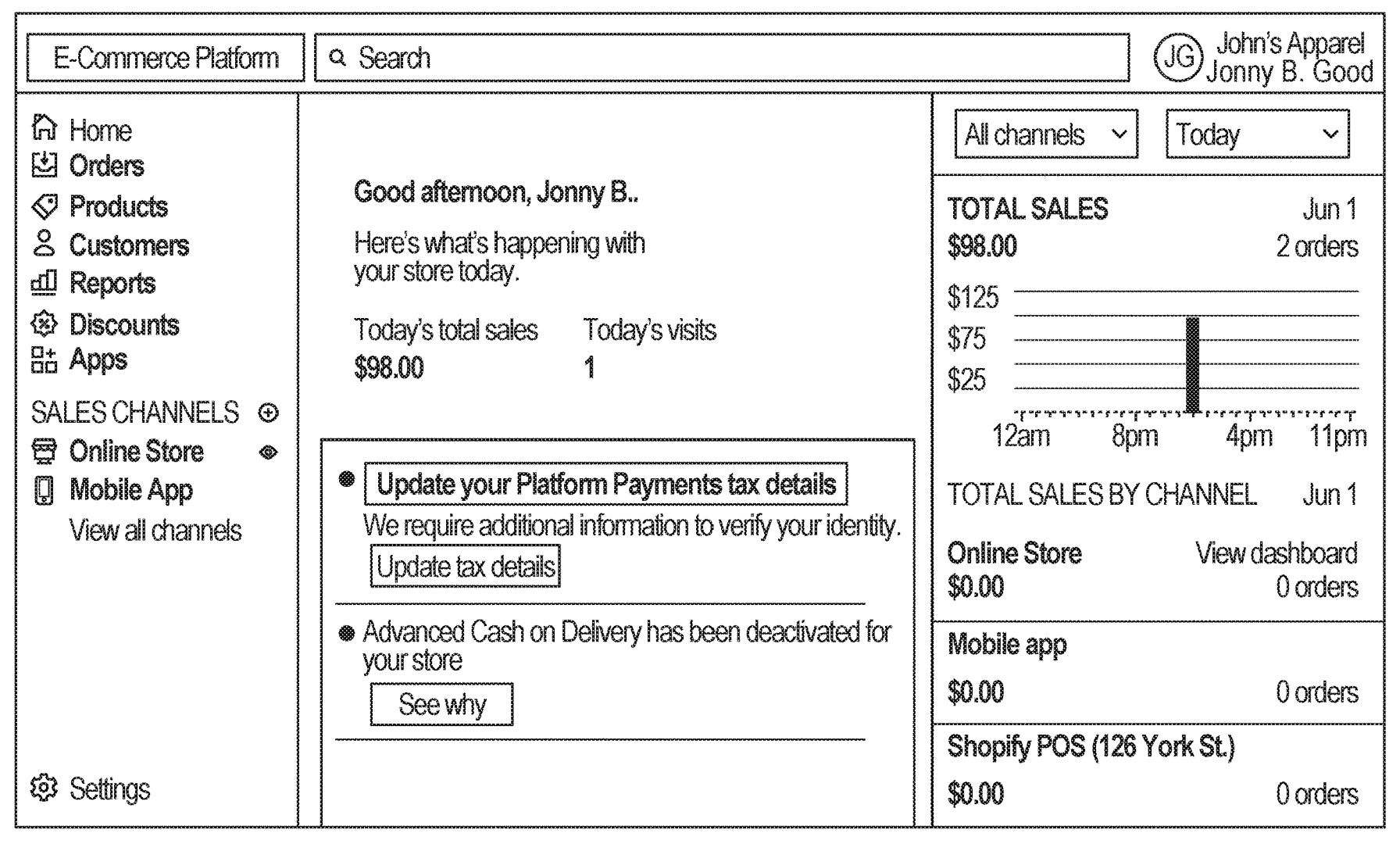

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory', customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 1142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 1142A-B, through extension/APT 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B, The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom APT call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Predicting Carbon Offset Values in the
E-Commerce Platform 100

Customers may wish to purchase products with a lower associated carbon footprint when shipped, or may wish to know the cost associated with offsetting a product's carbon footprint, in order to make informed decisions while browsing and making purchases from an online store. Sometimes, customers may wish to offset the carbon footprint associated with shipping packages containing products purchased in a merchant's online store in order to compensate for the package's environmental impact. In some embodiments, the e-commerce platform 100 may compute a monetary amount equivalent to (or indicative of) the carbon emissions associated with shipping the package to the customer, based on a predicted shipping route and transportation mode. In some embodiments, the customer may then be able to make a donation that matches the computed monetary amount. In order to predict carbon emissions, carbon offset estimation models may be implemented by the e-commerce platform 100 within the commerce management engine 136. The e-commerce platform 100 may present an indication of carbon emission (e.g. the carbon offset monetary equivalent of a package to be shipped to the customer) using a user interface on the customer device 150.

Figure 3:
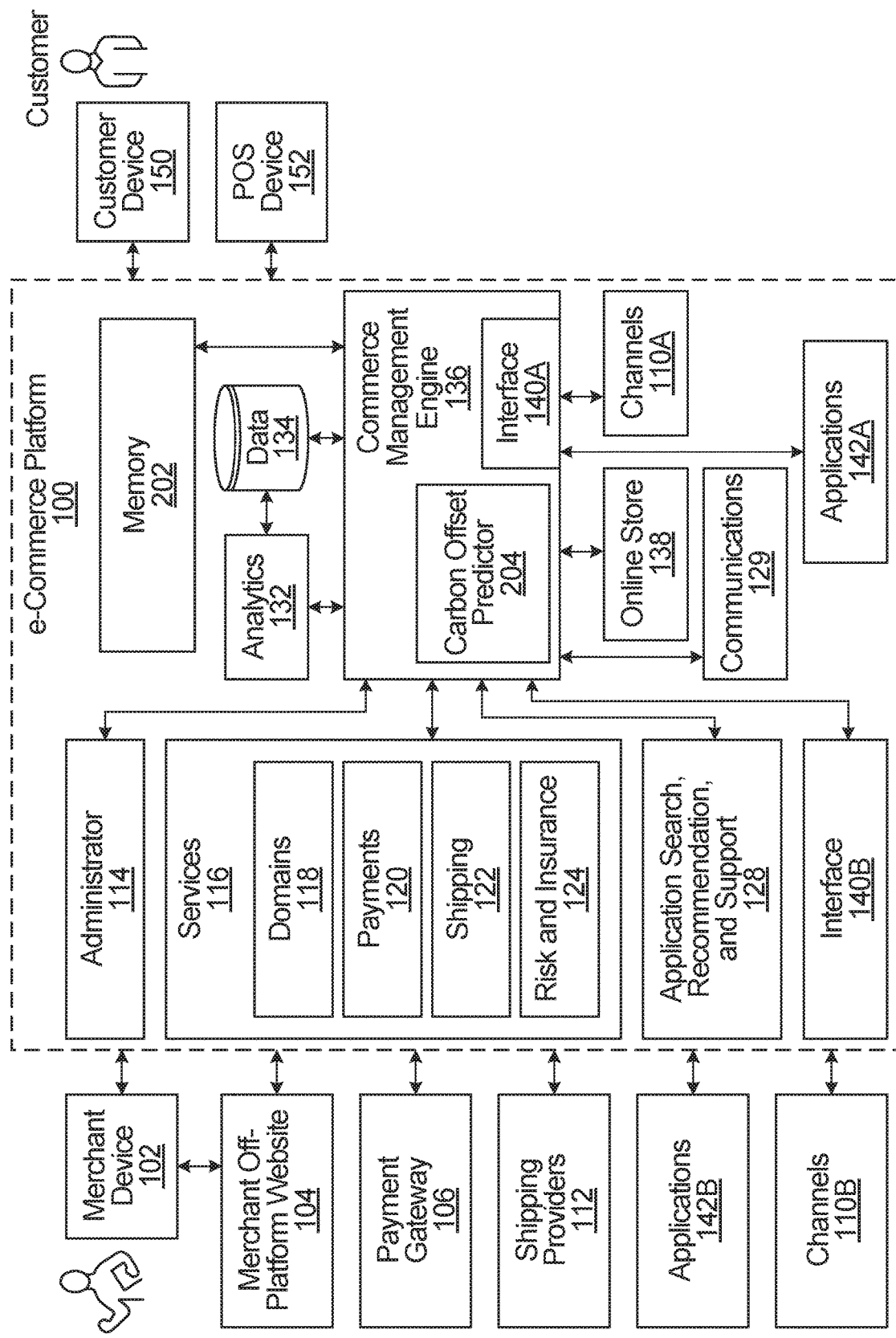
FIG. 3 illustrates the e-commerce platform of FIG. 1, but with a memory and a carbon offset predictor.

FIG. 3 illustrates the e-commerce platform 100 of FIG. 1, but with the additions of a memory 202 and a carbon offset predictor 204. All of these additional components may be part of and/or in two-way communication with the commerce management engine 136. The carbon offset predictor 204 performs the carbon offset prediction methods disclosed herein, e.g. predicting carbon offset values. For example, the carbon offset predictor 204 may determine a shipping route and transportation mode(s) used to transport a package to a customer, and estimate the carbon offset value associated with shipping the package. The carbon offset predictor 204 may be implemented by one or more general-purpose processors that execute instructions stored in a memory (e.g. in memory 202) or stored in another computer-readable medium. The instructions, when executed, cause the carbon offset predictor 204 to perform the operations of the carbon offset predictor 204, e.g., operations relating to predicting a carbon offset value for shipping a product purchased in a merchant's online store 138 to a customer. Alternatively, some or all of the carbon offset predictor 204 may be implemented using dedicated circuitry, such as an application specific integrated circuit (ASIC), a graphics processing unit (GPU), or a programmed field programmable gate array (FPGA). In some embodiments, the carbon offset predictor 204 and/or the memory 202 may be located externally to the e-commerce platform 100. In some embodiments, the memory 202 may be part of the carbon offset predictor 204.

The memory 202 linked with the commerce management engine 136 may include carrier models, completed shipping records, and a carbon offset calculation model, which may be used by the carbon offset predictor 204 of the commerce management engine 136. The models and data stored in the memory 202 may be established and maintained either in real time or non-real time, and may be used to assist in the prediction of the carbon offset value associated with shipping a package containing a product from a merchant's online store, e.g. as explained later.

Although the embodiments described herein may be implemented using carbon offset predictor 204 in e-commerce platform 100, the embodiments are not limited to the specific e-commerce platform 100 of FIGS. 1 to 3. For example, the embodiments may be implemented using any e-commerce platform. More generally, the embodiments are not necessarily limited to an e-commerce platform, but could be implemented in a standalone application or platform associated with a merchant's online store. Therefore, the embodiments below will be described more generally in relation to any system for predicting carbon offset.

Example System for Predicting Carbon Offset Values

Figure 4:
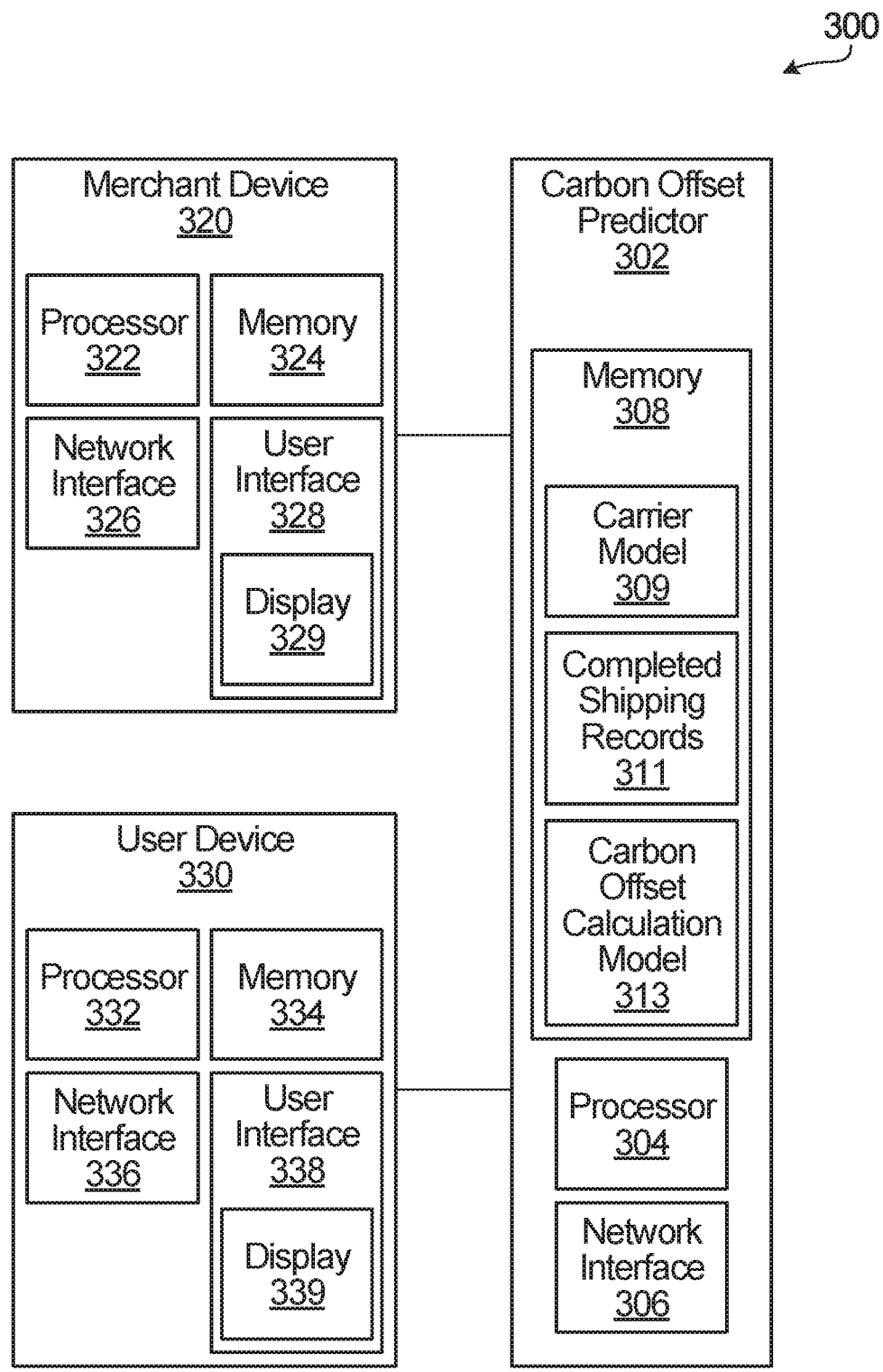
FIG. 4 illustrates a system for predicting the carbon offset value associated with a package to be shipped from a merchant's online store, according to one embodiment.

FIG. 4 illustrates a system 300 for determining a carbon offset value associated with shipping a package to a customer, and for presenting an associated indication of carbon emission to the customer while the customer is browsing or checking out from the online store, according to one embodiment.

The system 300 includes a carbon offset predictor 302 in communication with a merchant device 320 and a user device 330.

The carbon offset predictor 302 may be a part of an e-commerce platform, e.g. e-commerce platform 100. For example, the carbon offset predictor 302 may be implemented by a processor on the e-commerce platform 100 of FIG. 3. However, this is only an example. The carbon offset predictor 302 could also or instead be provided by another component of an e-commerce platform or implemented as a stand-alone component or service (e.g. web application) that is external to an e-commerce platform. In some embodiments, the carbon offset predictor 302 may be provided in the form of a downloadable application that is available for installation in relation to a merchant account, or a downloadable application that is available for installation by a customer. In addition, at least a portion of the carbon offset predictor 302 could be implemented on a merchant device and/or a user device, e.g. on merchant device 102 of FIG. 3 or on merchant device 320 described below or on customer device 150 of FIG. 3 or user device 330 described below. For example, the merchant device and/or the user device could store and run some or all of the carbon offset predictor 302 locally as a software application.

The carbon offset predictor 302 of system 300 includes a processor 304, a network interface 306, and a memory 308. The network interface 306 is for communicating over a network, e.g. to receive requests for web resources and transmit replies to such requests. The network interface 306 may be implemented as a network interface card (NIC), and/or a computer port (e.g. a physical outlet to which a plug or cable connects), and/or a network socket, etc., depending upon the implementation. The processor 304 directly performs, or instructs the carbon offset predictor 302 to perform, the operations of the carbon offset predictor 302. The processor 304 may be implemented by one or more general purpose processors that execute instructions stored in a memory (e.g. in memory 308). The instructions, when executed, cause the processor 304 to directly perform, or instruct the carbon offset predictor 302 to perform the operations described herein. In other embodiments, the processor 304 may be implemented using dedicated circuitry, such as a programmed FPGA, a GPU, or an ASIC. The memory 308 may include carrier models 309, completed shipping records 311, and carbon offset calculation model 313, which will be described in more detail later.

In some embodiments, the carbon offset predictor 302 may be implemented inside of an e-commerce platform. In some embodiments, some or all of the processor 304, memory 308, and/or network interface 306 may be located outside of the carbon offset predictor 302.

A plurality of merchants may access the carbon offset predictor 302 over a network using merchant devices, e.g. to receive indications of carbon emissions for packages to be shipped. In some embodiments, a carbon emission indication may be a carbon offset value or may be based on a carbon offset value. In some embodiments, a carbon emission indication may be in a web resource (e.g. in a web page). For ease of explanation, only a single merchant device 320 is illustrated in FIG. 4. The merchant device 320 includes a processor 322, a memory 324, a user interface 328, and a network interface 326. The processor 322 directly performs, or instructs the merchant device 320 to perform, the operations of the merchant device 320. Besides a merchant possibly using the merchant device 320 to obtain a carbon emission indication associated with shipping a particular product to a particular customer, the operations of the merchant device 320 may relate to managing an online store, e.g. providing an indication of the shipping methods and carriers that are possible for a customer to select for the shipment of one or more packages, through the use of user interface 328. The processor 322 may be implemented by one or more general purpose processors that execute instructions stored in a memory (e.g. memory 324). The instructions, when executed, cause the processor 322 to directly perform, or instruct the merchant device 320 to perform, the operations of the merchant device described herein. In other embodiments, the processor 322 may be implemented using dedicated circuitry, such as a programmed FPGA, a GPU, or an ASIC. The user interface 328 may be implemented as a display screen (which may be a touch screen), e.g. display 329, and/or a keyboard, and/or a mouse, etc., depending upon the implementation. The network interface 326 is for communicating with the carbon offset predictor 302 over the network. The structure of the network interface 306 will depend on how the merchant device 320 interfaces with the network. For example, if the merchant device 320 is a mobile phone or tablet, the network interface 326 may comprise a transmitter/receiver with an antenna to send and receive wireless transmissions to/from the network. If the merchant device 320 is a personal computer connected to the network with a network cable, the network interface 326 may comprise a network interface card (NIC), and/or a computer port (e.g. a physical outlet to which a plug or cable connects), and/or a network socket, etc.

A plurality of users may access the carbon offset predictor 302 over a network using user devices, e.g. to receive indications of carbon emissions for packages to be shipped. In some embodiments, a carbon emission indication may be a carbon offset value or may be based on a carbon offset value. In some embodiments, a carbon emission indication may be in a web resource (e.g. in a web page). For ease of explanation, only a single user device 330 is illustrated in FIG. 4. The user device 330 includes a processor 332, a memory 334, a user interface 338, and a network interface 336. The processor 332 directly performs, or instructs the user device 330 to perform, the operations of the user device 330 described herein, e.g. receiving a carbon emission indication and displaying such an indication through the use of display 339 of user interface 338. The processor 332 may be implemented by one or more general purpose processors that execute instructions stored in a memory (e.g. memory 334). The instructions, when executed, cause the processor 332 to directly perform, or instruct the user device 330 to perform, the operations of the user device 330 described herein. In other embodiments, the processor 332 may be implemented using dedicated circuitry, such as a programmed FPGA, a GPU, or an ASIC. The user interface 338 may be implemented as a display screen (which may be a touch screen), and/or a keyboard, and/or a mouse, etc., depending upon the implementation. The network interface 336 is for communicating with the carbon offset predictor 302 over the network, e.g. to transmit a request for a web resource and to receive a web resource having the carbon emission indication. The structure of the network interface 306 will depend on how the user device 330 interfaces with the network. For example, if the user device 330 is a mobile phone or tablet, the network interface 336 may comprise a transmitter/receiver with an antenna to send and receive wireless transmissions to/from the network. If the user device 320 is a personal computer connected to the network with a network cable, the network interface 336 may comprise a network interface card (MC), and/or a computer port (e.g. a physical outlet to which a plug or cable connects), and/or a network socket, etc.

As described in more detail below, the carbon offset predictor 302 may include one or more computer models stored as carrier models 309. These models may be generated using shipping records 311 and then used to predict a shipping route used by a carrier to ship a package and the method of transportation used to ship the package during each segment of the shipping route. As well, a model may be generated, based on the results of one or more carrier models 309, to predict a carbon offset value associated with shipping a package. The model may be stored as carbon offset calculation model 313. The one or more models may be updated over time as they are used and as more information is collected, e.g. based on actual shipping events and actual transportation modes used.

Creation of the Carrier Models

In some embodiments, a separate computer model is created for each carrier by analyzing the shipping records for a large number of packages previously shipped and delivered by that carrier in order to find patterns or relationships between shipping events. Following its generation, the model may be stored as a carrier model 309 in the memory 308 of carbon offset predictor 302.

FIG. 5 illustrates an example shipping record 400 for a package that was previously shipped by a merchant and delivered to a customer who purchased an item from the merchant's online store. The shipping record 400 is stored in memory, e.g. as one record of a collection of completed shipping records 311 in memory 308 of the carbon offset predictor 302, or in memory 202 of the e-commerce platform 100. The shipping record 400 stores the tracking identifier 402 and an indication of the carrier 404 that shipped and delivered the package. The shipping record 400 further stores a time-ordered list of shipping events 406, a list of locations at which each corresponding shipping event occurred 408, and a list of date/time stamps 410 to indicate when the corresponding shipping event occurred. Here, the identifier 402 is "1Z28W7772027341888" and the carrier 404 is UPS. An example of a shipping events 406 in the shipping record may be "Pickup", indicating that the package has been picked up from the merchant by the carrier. The location 408 of this event is recorded in memory as San Francisco, USA and the corresponding date/time stamp 410 indicates that the pickup event occurred on Apr. 20, 2020 at 10 AM.

In some embodiments, the carrier may be determined from the tracking identifier. For example, a tracking identifier may uniquely map to a particular carrier. The tracking identifier may also uniquely map to other information, such as mail class. Alternatively, the carrier may have been indicated by the merchant. For example, the merchant may have explicitly indicated the carrier of a package using the merchant device 320 in communication with the carbon offset predictor 302 of system 300. For example, the merchant may, through the use of UI 328, indicate that package 1Z28W7772027341888 of completed shipping record 400 was shipped via the carrier UPS. In some embodiments, if the merchant uses an e-commerce platform or other application to connect with and select a carrier, then once the carrier is selected the identity of the carrier is stored as part of the shipping record 400.

Each event in a shipping record, such as in shipping record 400, is referred to as a shipping event. Each shipping event may be recorded in the shipping record 400 by using the tracking identifier. The tracking identifier may be encoded in a machine-readable code, such as a barcode or QR code. The machine-readable code is typically included on the shipping label affixed to the outside of the package. Whenever a shipping event occurs during the shipping process, e.g. the package arrives at or leaves a depot, the machine-readable code is read by a device at the event location and the shipping status is updated. In this way, the shipping record 400 is populated as the package travels from its origin to its destination.

A large number of shipping records may be analyzed by the carbon offset predictor 302 to generate a model that stores all known shipping routes for each carrier. Each shipping route consists of a set of shipping route segments, where each segment connects adjacent shipping events in the shipping route. For example, a shipping route segment may be "Depart San Francisco Depot to Arrival at Los Angeles Depot". Each segment may have an associated distance (e.g. 380 miles), an associated transit time (e.g. an average transit time such as 5 hours), and an associated predicted mode of transportation (e.g. truck, air, train, boat, etc.).

Figure 6:
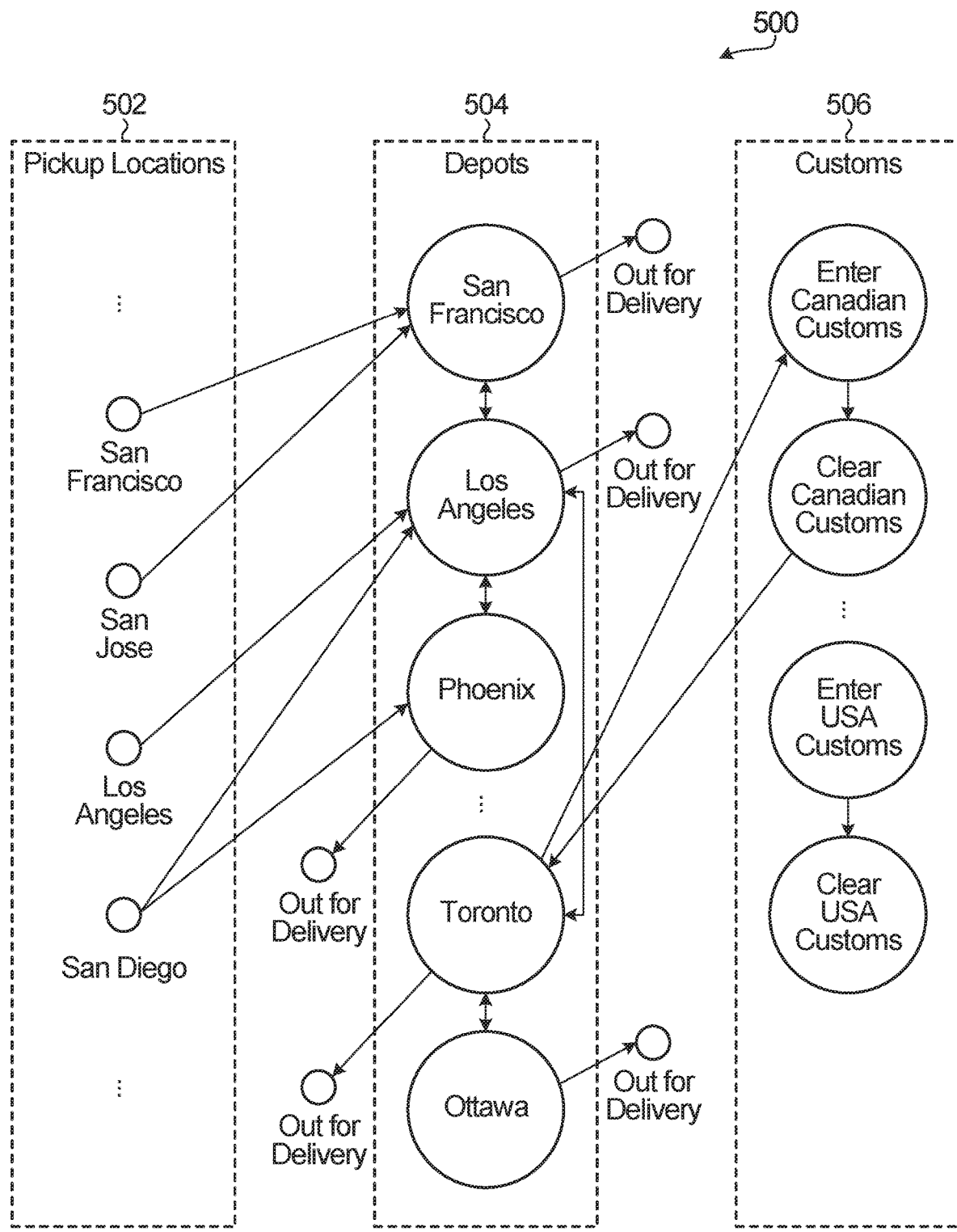
FIG. 6 illustrates a package tracking model in the form of a directed graph, according to one embodiment.

FIG. 6 illustrates an example of a carrier model 309 for a particular carrier, in the form of a directed graph model 500. In actual implementation, the carrier model 309 may be stored as one or tables, or in an equivalent format. Each node in the directed graph represents a shipping event, and arrows connecting various nodes indicates consecutive shipping events. The model 500 includes several nodes representing pickup locations 502 indicating the package's city of origin. Examples of pickup locations 502 include San Francisco, San Jose, Los Angeles, and San Diego. The model 500 may also include several nodes representing depots 504, where the packages are sorted and prepared for further distribution. A "depot" as used herein encompasses any facility in which a package is temporarily held during the shipping process. For example, a depot may be a fulfillment center, a warehouse, a storage facility, a terminal, etc. Model 500 includes depots 504 in San Francisco, Los Angeles, Phoenix, Toronto, and Ottawa. The model 500 indicates that packages can travel between various depots 504 as consecutive shipping events. For instance, packages at the Phoenix depot may be shipped to the Los Angeles depot or vice versa. As well, packages at a depot may be sent out for delivery' to the customer, e.g. if the depot is in the same city as the delivery address. Several nodes are also used to represent shipping events relating to customs 506 when packages are shipped across international borders. Examples of customs shipping events 506 include entering Canadian customs and clearing Canadian customs.

The model 500 connects two shipping events by an arrow if the events occur consecutively. For instance, in model 500 the package can be sent directly from the Los Angeles depot to the Toronto depot, and vice versa, but not from the Phoenix depot directly to the Toronto depot. The possible routes and consecutive shipping events stored in the model 500 are determined from past shipping records such as from completed shipping record 400 and other completed shipping records 311. For example, the completed shipping records 311 from packages previously shipped by the carrier may reveal that that packages are not routed from Phoenix directly to Toronto, but instead that all packages originating from the southwestern USA are routed through the Los Angeles depot to the Toronto depot.

One example of a series of shipping events possible according to the directed graph model 500 is as follows. A package is picked up from a merchant in San Francisco by the carrier, who then transports the package to the San Francisco depot. The carrier then transports the package to the Los Angeles depot, and then to the Toronto depot. After arrival at the Toronto depot, the package enters Canadian customs, clears Canadian customs, and is then sent from the Toronto depot out for delivery by the carrier to a customer in the Toronto area.

Each segment in the model that represents the physical transit between two adjacent locations may have an associated average transit time, which is computed from previous shipping records. A distance between the two adjacent locations may also be determined. The mode of transportation between the two adjacent locations may then be predicted based on the distance between the two adjacent locations and possibly also the average transit time. For example, a model in the form of a predefined mapping may map a particular combination of distance and transit time to a corresponding predicted transportation mode.

Figure 7:
FIG. 7 illustrates an example of a model stored in memory for predicting the mode of transportation used to ship a package, according to one embodiment.

FIG. 7 illustrates an example of a model 600 for predicting the mode of transportation used by a particular carrier to ship a package based at least on the transit distance of a shipping route segment. The model 600 may be part of a carrier model, such as one of carrier models 309 stored in memory 308 of the carbon offset predictor 302. Model 600 includes the transit distance 602 travelled by a package on one segment of the shipping route, the average transit time 604 of the one segment of the shipping route, and the predicted mode of transportation 606 based on the transit distance 602 and average transit time 604. For example, if a package is travelling between a depot in San Diego and a depot in Los Angeles, the transit distance is between 60 miles and 1000 miles. Therefore, the model would predict that the mode of transportation used to ship the package during this segment of the shipping route is a transport truck.

FIG. 7 is one embodiment of a model 600 used to determine the predicted mode of transportation for each segment of a shipping route. In other embodiments, the model may incorporate additional and/or different factors, e.g.: whether the two adjacent locations are separated by water (which may result in the predicted mode of transportation being a boat depending upon the average transit time); carrier-specific variables, e.g. if it is known in advance that U.S. Postal Service does not ship by train; mail class; etc. Also, the distance between the two adjacent locations may be calculated using straight-line distance, or by more sophisticated means, such as tracking actual distances of flight routes or using map navigation technology to determine the shortest path on legitimate roads, etc.

A model for a particular carrier may have different variations or variables. For example, a package being shipped from San Francisco to Toronto by a particular carrier may have a different route and/or different mode(s) of transportation dependent upon factors such as: mail class, characteristics of the package such as size and/or weight, and/or the season during which the package is shipped. For example, the package may travel in-part by air if expedited shipping is selected, and by train if expedited shipping is not selected. In another example, a large package (such as a fridge) may travel by train and/or truck, whereas a small package (such as a key chain) may travel in part by air. In yet another example, shipping routes and/or modes of transportation may vary around the Christmas season (and/or other high seasons such as, for example, Black Friday/Cyber Monday) compared to in June based on the volume of packages shipped via a carrier during that time period.

Also, different variations of a carrier model 309 may be associated with different merchants and/or different products or packages. For example, if previous shipping records indicate that merchant Fred always ships packages containing products from his online store, Fred's Pet Goods, using FedEx Priority (express) and merchant Jane always ships products from her online store, Jane's Accessories WebStore, using FedEx Economy (not express), then the version of the FedEx carrier model for Priority can be associated with Fred's Pet Goods and the version of the FedEx carrier model for Economy can be associated with Jane's Accessories WebStore. As another example, if previous shipping records indicate that U.S. Postal Service (USPS) uses a different route and/or mode of transportation for packages that are over 30 pounds compared to packages that are under 30 pounds, then the version of the USPS carrier model for shipments over 30 pounds can be associated with packages over 30 pounds and vice versa.

The different variations of each carrier model 309 may be stored in memory, e.g. in the form of one or more tables. As one example, the directed graph 500 illustrated in FIG. 6 may be stored as the table-based model 700 illustrated in FIG. 8 for a particular carrier and a first set of conditions. The model 700 may include identifying information 712 that includes characteristics of a package being shipped. For example, model 700 may store shipping information for a package weighing less than 30 pounds shipped using FedEx's Priority mail class. Each row of the model is indicative of one segment of a shipping route, in which each row describes shipping information for a segment that occurs between a first shipping event 702 and a second shipping event 704. Each row also includes that distance 706 between the location of the first and second shipping events, the average time that the package is in transit 708 for the segment of the shipping route, and the predicted transportation mode 710 of the package during the segment of the shipping route. The predicted transportation mode 710 of the route segment may be determined using a model such as model 600, e.g. based on the characteristics of the shipping route segment and/or the package being shipped.

For example, a shipping route segment for a package under 30 pounds shipped using FedEx Priority may be a product from Fred's Pet Goods. The first shipping event 702 may be the pick-up of a package containing a product to be shipped from Fred's Pet Goods and the second event 704 may be the arrival of the package at the San Francisco depot. It may be stored in model 700 that the distance between the package's location of origin and the San Francisco depot is less than 60 miles, and it takes an average of 1.2 hrs from pickup to arrival at the San Francisco depot. The model 700 may also store that the predicted transportation mode 710 for this segment of the shipping route is a pickup/delivery truck based on characteristics such as the transit distance, as per the model 600 of FIG. 7.

FIG. 9 illustrates a carrier model 800 similar to the model shown in FIG. 8, but for a different set of conditions. Like model 700, model 800 may be one of carrier models 309 stored in memory 308 of the carbon offset predictor 302. Model 800 includes identifying information 812, indicating that the model 800 is used for a set of conditions in which a package weighing less than 30 pounds is shipped using FedEx's Economy mail class, such as a package containing a product purchased from Jane's Accessories WebShop. Each row describes shipping information for a segment that occurs between a first shipping event 802 and a second shipping event 804 Each row also includes that distance 806 between the location of the first and second shipping events, the average time that the package is in transit 808 for the segment of the shipping route, and the predicted transportation mode 810 of the package during the segment of the shipping route.

Through shipping using FedEx Economy, the average transit time 808 of a segment of the shipping route may be longer than if the package was shipped using the Priority mail class. For example, the last listed shipping route segment of models 700 and 800 is the segment between the departure of the depot in Los Angeles and the arrival of the package at the depot in Toronto. The shipping segment spans 2500 miles. The average transit time is 7.8 hours when a package is shipped using the Priority mail class and 3.3 days when a similar package is shipped using the Economy mail class. Based on the disparity in the average transit time of similar packages, the predicted transportation mode of the packages differs. The predicted transportation mode may be based on a predictive model such as model 600, in which the predicted mode of transportation of a package during a shipping route segment with a transit distance exceeding 1000 miles varies based on the average transit time 604. As the average transit time of the last shipping route segment in model 700 of FIG. 8 is less than two days, the package is predicted to travel by airplane. Conversely, the average transit time of the last shipping route segment in model 800 of FIG. 9 exceeds two days, so the package is predicted to travel by train.

The carrier models 309, including the models of FIGS. 6 to 9, may be updated over time as more information is collected based on the actual shipping events and transit times, e.g. if a carrier adds or eliminates depots, changes shipping routes, changes average transit times (which may indicate that the mode of transportation has changed), new origins and destinations are added, etc.

Use of the Carrier Models for Calculation of Carbon Footprint

In some embodiments, when a customer is browsing or checking out from a merchant's online store, the processor 304 of the carbon offset predictor 302 first predicts the carrier that the merchant will use to ship the package, unless the carrier is known in advance. The prediction may be based on a carrier previously used by the merchant, which may be a function of: product or products being viewed or purchased, and/or origin address (where the product is being shipped from, which may be a function of current inventory location), and/or delivery address (where the product is being shipped to), and/or shipping service level selected or anticipated (e.g. expedited shipping versus non-expedited shipping), etc.

For example, based on past shipping records a model may be stored in memory 308 that maps different products and/or conditions to a predicted carrier for a merchant. FIG. 10 illustrates an example of a model 900 stored in memory that maps different products and/or conditions to a predicted carrier for products sold in a Merchant Jane's Accessory Store 910. Model 900 includes the product II)s 902 of products sold in the online store, the possible shipping service levels (mail class) 904 of each product, the possible delivery addresses 906 of the product, and the predicted carrier 908. For example, in the illustrated example the model 900 includes shipping data for product 0001 ("Pineapple Keychain"). Product 0001 can be shipped using either a regular or expedited shipping service level 904, and can be shipped to addresses in either the USA or Canada. The predicted carrier 908 associated with shipping product 0001 using the regular service level to the USA is USPS. However, the predicted carrier 908 associated with shipping product 0001 using the regular service level to Canada, or the expedited service level to either Canada or the USA, is FedEx. The predicted carrier 908 may be populated based on previous actions performed by Merchant Jane, e.g. if it is recorded that in the past, product 0001 ("Pineapple Keychain") has always been shipped by USPS when regular shipping service level is selected for a delivery address in the USA.

Based on the model 900, the processor 304 of the carbon offset predictor 302 predicts the carrier and retrieves the relevant carrier model 309 for the predicted carrier. The carrier model is then used to predict the shipping route and predicted mode of transportation for each segment of that shipping route.

FIG. 11 illustrates an example model 1000 stored in memory for a predicted carrier, which is used to predict a mode of transportation used to ship a package for each segment of a predicted shipping route. Model 1000 may be part of a carrier model 309 stored in memory 308 within the carbon offset predictor 302. The model in FIG. 11 is an example model 1000 in which the predicted carrier and service level is FedEx Priority, the package weight is less than 30 pounds, and the package is being shipped from San Francisco, USA to Toronto, Canada. Model 1000 includes rows representing each shipping route segment 1002, the distance travelled by the package during the shipping route segment 1004, and the predicted transportation mode of the package 1006. For example, the first shipping route segment is "Pick-up to Arrival at San Francisco Depot", during which the package travels 48 miles. The package is predicted to be transported by a pickup/delivery truck for this shipping route segment based on the model.

The distances associated with the shipping route segments that include the pick-up or the delivery of the package (e.g. the distances "48 miles" and "15 miles" in FIG. 11) may be computed using known, assumed, or predicted origin and delivery addresses. The distances may have been computed using either straight-line distance or using more detailed navigational information to calculate distance for an exact routing. These distances may instead be set as an average distance (e.g. based on a typical pickup/delivery route).

In some embodiments, each mode of transportation may be mapped to a cost value (e.g. carbon offset dollar amount), which may be a function of different conditions such as weight and/or size of the package, transportation distance, etc.

FIG. 12 illustrates an example of a model 1100 stored in memory that includes the associated carbon offset amount 1106 for a particular condition associated with shipping a package. Model 1100 is an example of carbon offset calculation model 313 stored in memory 308 of the carbon offset predictor 302. The model 1100 may include the modes of transportation 1102 that may be used to transport the package, the weight of the package 1004, and the carbon offset amount 1106 associated with the mode of transportation 1102. The carbon offset amount 1106 is a rate (in terms of monetary value per mile) to offset the carbon emissions associated with shipping a package of a particular weight using a particular mode of transportation based on the transportation distance of a package. The carbon offset amount 1106 for shipping using an airplane may be greatest, as the carbon emissions associated with fueling and operating an airplane is greater than the emissions associated with the use of land-based transportation options. The shipment of a heavy package may increase the carbon offset amount 1106 associated with a package, as a heavy package typically takes more fuel to transport and/or further limits the number of other packages that may be transported in a particular vehicle for shipment.

For example, model 1100 stores "Airplane" as one mode of transportation 1102. For packages weighing less than 30 pounds, the associated carbon offset amount is 0.13 cents/mile. On the other hand, packages weighing more than 30 pounds have an associated carbon offset amount of 0.2 cents/mile.

The processor 304 of the carbon offset predictor 302 may use the models in some or all of FIGS. 6 to 12 to compute a carbon offset value. For example, assuming a package less than 30 pounds is shipped by FedEx Priority from San Francisco to Toronto, and continuing the example explained above, the carbon offset value for each segment is as follows:

Segment 1—Pickup to San Francisco Depot: Pickup/Delivery Truck, 48 miles×0.07 cents/mile=3.36 cents;
Segment 2—San Francisco Depot to Los Angeles Depot: Transport Truck, 380 miles×0.04 cents/mile=15.2 cents;
Segment 3—Los Angeles Depot to Toronto Depot: Air, 2500 miles×0.13 cents/mile=325 cents;
Segment 4—Toronto Depot to Delivery: Pickup/Delivery Truck, 15 miles×0.07 cents/mile=1.05 cents.

The resultant sum of the carbon offset amount rounded to the nearest cent is $3.45.

The amount of $3.45 is an example of a carbon offset value. A carbon emission indication, e.g. the amount itself (or a fraction or multiple thereof) and/or a message based on the amount (e.g. "Not a Green Choice") may then be presented to the buyer. The carbon emission indication may be presented in a web resource, such as part of a product page requested by the buyer when the buyer is browsing on an online store, or during checkout. In some embodiments, the carbon emission indication may be a monetary amount (e.g. the carbon offset value itself or a fraction or multiple thereof), which may be presented to the buyer as an additional cost indicative of shipping the product to the buyer. In one example, the additional monetary amount may be in the form of a donation (e.g. to a charitable organization that performs carbon sequestering) or a surcharge, that may be added to the purchase price at the time the buyer is checking out.

In some embodiments, using the methods above, e.g. using the models in FIGS. 6 to 12, the carbon offset predictor 302 is able to provide an indication of carbon emission associated with shipping a package, before the package has even shipped, in order to provide the user with an indication of the carbon emission during interactive scenarios, such as while browsing product pages or checking out. The models may be generated in non-real time, and then in real-time when a request from a user device 330 is received for a web resource associated with a product (e.g. a request is received for a product page for the product), the carbon offset predictor 302 can obtain an indication of carbon emission that would be associated with shipping that product to the user associated with the user device 330. The carbon offset predictor 302 can then include, in the generated web resource, the indication of carbon emission. The indication may be equal to or based on a predicted carbon offset value, e.g. based on carbon emission segment values computed for each shipping route segment of the predicted shipping route. The action of obtaining the carbon emission indication is performed without incurring undue delay in providing the requested web resource (e.g. product page) to the user device 330, and yet the action is still specific to the user device 330 and the product. For example, upon receiving a request for a web resource from the user device 330, the reply to the request may be generated in real-time and yet include: obtaining a delivery address associated with the user device 330 (which may have been previously provided by the user and stored in a user profile); obtaining an origin address associated with the product (which may be a function of where the product inventory is currently located); identifying a shipping route for shipping the product from the origin address to the delivery address (e.g. using the models explained above); determining a respective transportation mode and distance for each shipping route segment of the shipping route (e.g. using the models explained above); and obtaining a carbon emission indication based on a respective carbon emission segment value for each shipping route segment of the shipping route. The web resource is then generated to include the carbon emission indication and provided to the user device 330, all in the context of an interactive web scenario, e.g. browsing a product page, which is time constrained because a user device 330 will only wait so long for a requested web resource. A different user device requesting the same web resource can, in general, receive a different carbon emission indication, e.g. based on the delivery address associated with that user device 330.

Example User Interfaces

In some embodiments, an indication of carbon emission associated with shipping a product to a delivery address corresponding to a particular user device 330 may be determined before checkout, e.g. when a user of the user device 330 is visiting the product page for the product. The indication may be equal to or based on a predicted carbon offset value. Information typically used for the prediction, such as the delivery address and shipping service level (e.g. expedited versus non-expedited shipping) may be predicted or assumed. For example, if the user is registered with the merchant or application (e.g. registered on the platform) and has previously purchased products, then their delivery address may be known. As another example, if the merchant always ships the product using the same carrier and shipping service level, then that carrier and shipping service level may be assumed. As another example, if the user already has other items in their online cart, then the package weight may be assumed to be the weight of the items in their online cart plus the weight of the product the buyer is viewing.

Figure 13:
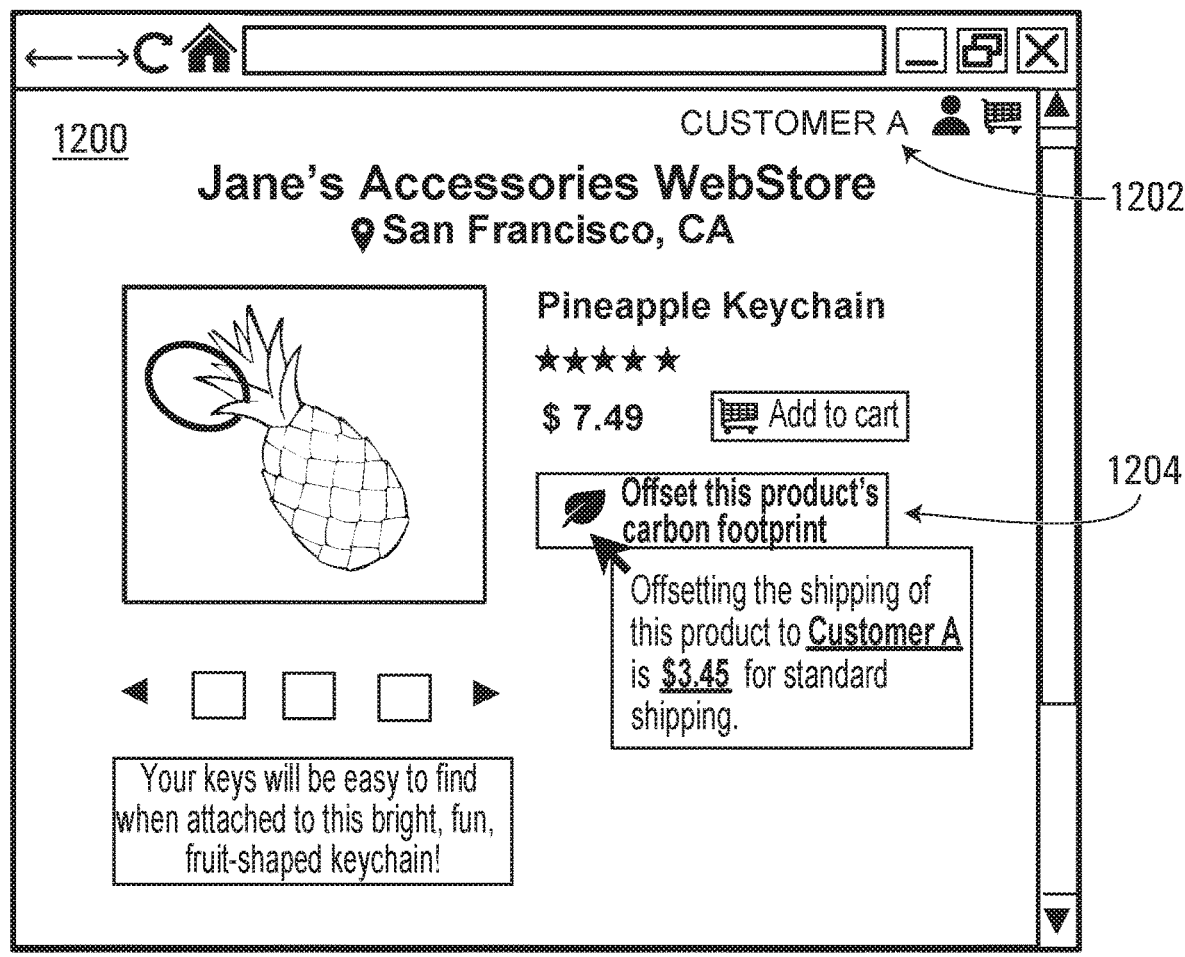
FIGS. 13 to 14 are user interfaces of a product web page that provide the customer with carbon offset information, according to various embodiments.

FIG. 13 illustrates a user interface of a product web page 1200 according to one embodiment in which a carbon emission indication associated with shipping the product to a customer is provided to that customer. The product web page 1200 includes an indication of a logged-in customer profile 1202 and a carbon impact information message 1204. The product web page may be a web resource presented to the customer using the display 339 of the user interface 339 of the user device 330. The web page 1200 of FIG. 13 is the product web page for the "Pineapple Keychain" product in Jane's Accessories WebStore.

On product web page 1200, Customer A (i.e. the user associated with user device 330) is logged in to either Jane's Accessories WebStore or an e-commerce platform with an existing customer profile 1202, as indicated by the icon and message in the upper-right corner. Customer A's existing profile may include information such as their delivery address, which may be provided to the carbon offset predictor 302. This information may be used by a carrier model 309 and carbon offset calculation model 313 in the memory 308 of the carbon offset predictor 302 in order to provide an estimate of the carbon offset value of shipping a package containing the product to the customer. For example, Customer A's profile may indicate that their delivery address is located in Toronto, Canada.

In other implementations, the delivery address of the customer might not be provided by an existing profile associated with a merchant's online store or an e-commerce platform and may be determined in an alternative manner. For example, the carbon offset predictor 302 may provide a prompt to the customer to input a delivery address via the display 339 of the user device 330. In another implementation, the carbon offset predictor 302 may request access to the location of the user device 330, and/or determine a delivery address based on location information from an IP address or global position system (GPS). In yet another implementation, the delivery address may be determined based on a user profile associated with a browser the customer is using to access the online store.

The carbon impact information message 1204 may be a box marked by a leaf icon including the text "Offset this product's carbon footprint". Hovering a cursor over box 1204 or clicking on the box may present Customer A with a carbon emission indication associated with shipping the "Pineapple Keychain" to Customer A. The carbon offset predictor 302 deploys the carrier models 309 and carbon offset calculation model 313 in real-time while a user is browsing product web pages, providing the carbon emission indication to the customer without inconvenience or delay. Here, the indication provides the text "Offsetting the shipping of this product to Customer A is $3.45 for standard shipping". This allows the customer to make informed decisions regarding the environmental impact of products that they may purchase online without disrupting typical online activity in the merchant's online store. The value $3.45 is an example of a carbon emission indication.

Figure 14:
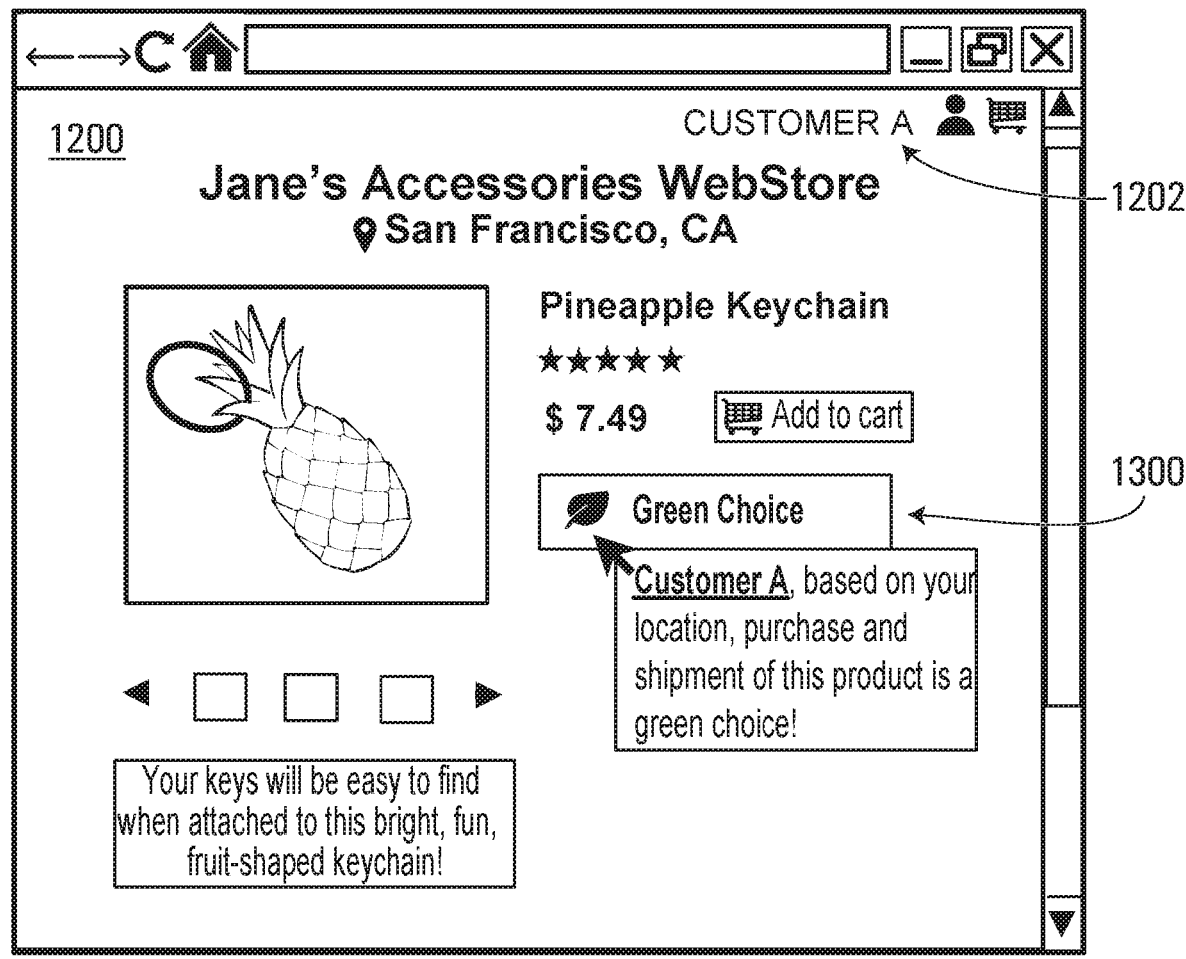

FIG. 14 is a variation of FIG. 13 in which the product page 1200 includes carbon emission indication 1300. Here, the carbon emission indication 1300 is a box marked by a leaf icon with the text "Green Choice". When a customer interacts with the box, such as by clicking or hovering, more detail may be provided, such as the message: "Customer A, based on your location, purchase and shipment of this product is a green choice!". This message is provided to the display 339 of the user interface 338 of the user device 330 by the carbon offset predictor 302 to indicate that the shipment of a package containing this product is not associated with a significant level of carbon emissions. In the user interface of FIG. 14, Customer A is logged into the merchant's online store with a profile that includes a delivery address, which is used by the carbon offset predictor 302 to predict the delivery route and emissions associated with shipping the "Pineapple Keychain".

The indication that purchasing and receiving shipment of the "Pineapple Keychain" is a "green choice" may be determined by the carbon offset predictor 302 based on the associated carbon offset value predicted based on the location of the origin address and the delivery address for Customer A. In one implementation, the carbon offset predictor 302 may determine that a product is a "green choice" because the carbon offset value determined using the models above falls below a particular threshold. For example, the threshold may be determined by the carbon offset predictor 302 based on the average of carbon offset values associated with shipping packages containing similar products to the delivery address of the customer. In another implementation, the carbon offset predictor 302 may determine that a product is a "green choice" based on the proximity of the origin and delivery addresses. For instance, a lower carbon offset value may be associated with shipping a package locally, as high-emission forms of transportation might not be required.

Figure 15:
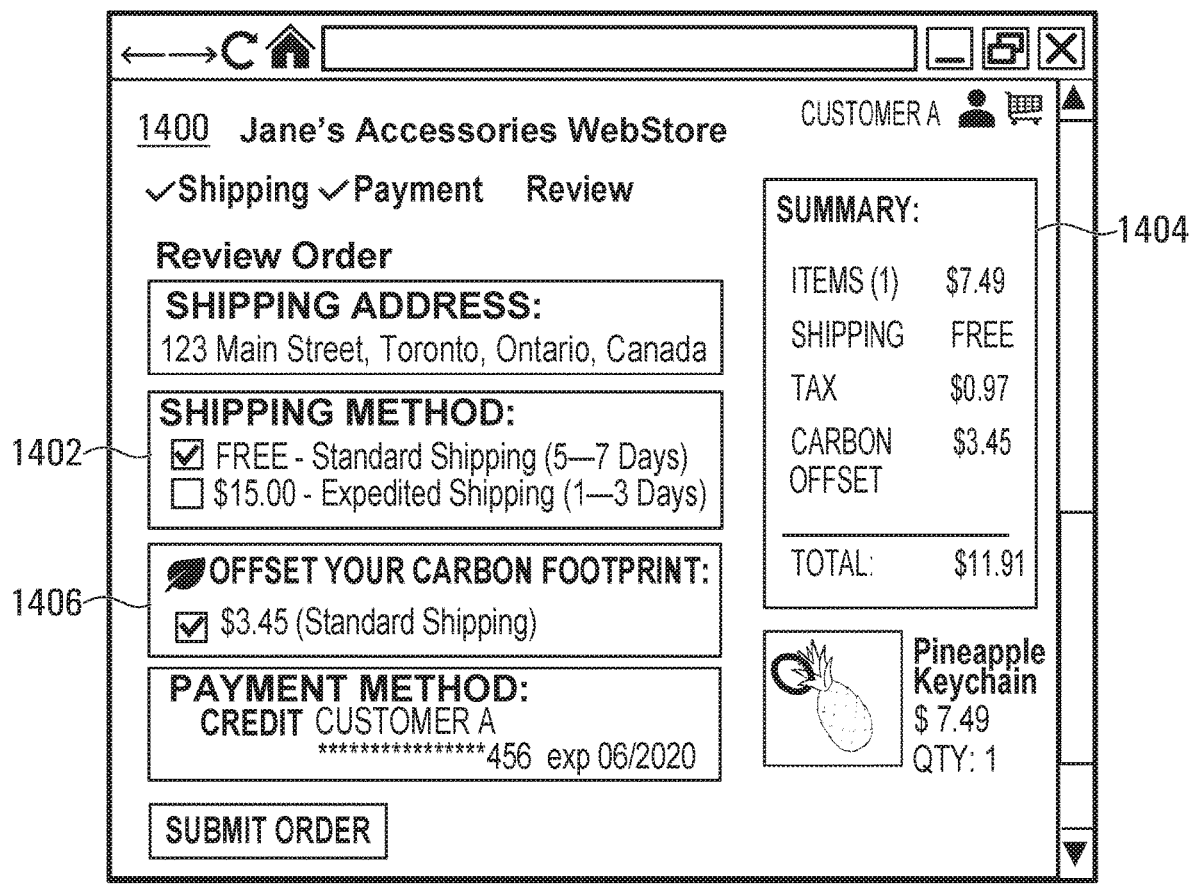
FIGS. 15 to 16 are user interfaces of a checkout page of a merchant's online store, according to various embodiments; and, FIG. 17 illustrates steps of a computer-implemented method, according to one embodiment.

In another embodiment, a carbon emission indication associated with shipping one or more products may be provided to a customer when they are checking out and purchasing products from a merchant's online store. FIG. 15 is a user interface of a checkout page 1400 of a merchant's online store, in which the customer may add on a monetary value equivalent to a carbon offset amount ($3.45). The carbon offset amount is the carbon emission indication and in this example is the same as the predicted carbon offset value. The checkout page 1400 may be provided to the customer via the display 339 of the user interface 338 of a user device 330. The checkout page 1400 illustrates Customer A purchasing the "Pineapple Keychain" product from Jane's Accessories WebStore, and may include the ability to select the shipping method 1402, the ability to offset the carbon emissions associated with shipping 1406, and a summary section 1404 of all of the costs associated with purchasing the "Pineapple Keychain".

In the checkout page 1400, Customer A is able to select the shipping method used to ship a package containing the "Pineapple Keychain". Customer A may opt for free standard shipping, or expedited shipping for an additional $15.00. The shipping service level (mail class) selected may be used by a carrier model 309 and/or carbon offset calculation model 313 within the carbon offset predictor 302 in order to determine the delivery route, methods of transport used to deliver the package, and the carbon offset amount associated with shipping the package.

The checkout page 1400 may allow the customer to opt in to offsetting the carbon emissions associated with shipping their package, as per display element 1406. In FIG. 15, Customer A is presented with a monetary amount determined by the carbon offset predictor 302 based on their selected shipping service level (mail class), the delivery address, and the address of origin in conjunction. The carrier models 309 and carbon offset calculation model 313, such as models 900, 1000, and 1100, may be used to determine that the "Pineapple Keychain" ordered by Customer A and for shipping to Toronto, Canada from San Francisco, USA may travel by pickup/delivery truck, transport truck, and airplane for various shipping route segments, where the sum of the carbon offset values of the route segments adds to $3.45.

The cost summary section 1404 of checkout page 1400 provides the customer with the total amount associated with purchasing and receiving shipment of the product. The summary includes the base cost of the "Pineapple Keychain", the cost of the chosen shipping method, the tax on the base cost of the item, and the carbon offset amount, if the user opts to offset their carbon footprint.

Figure 16:
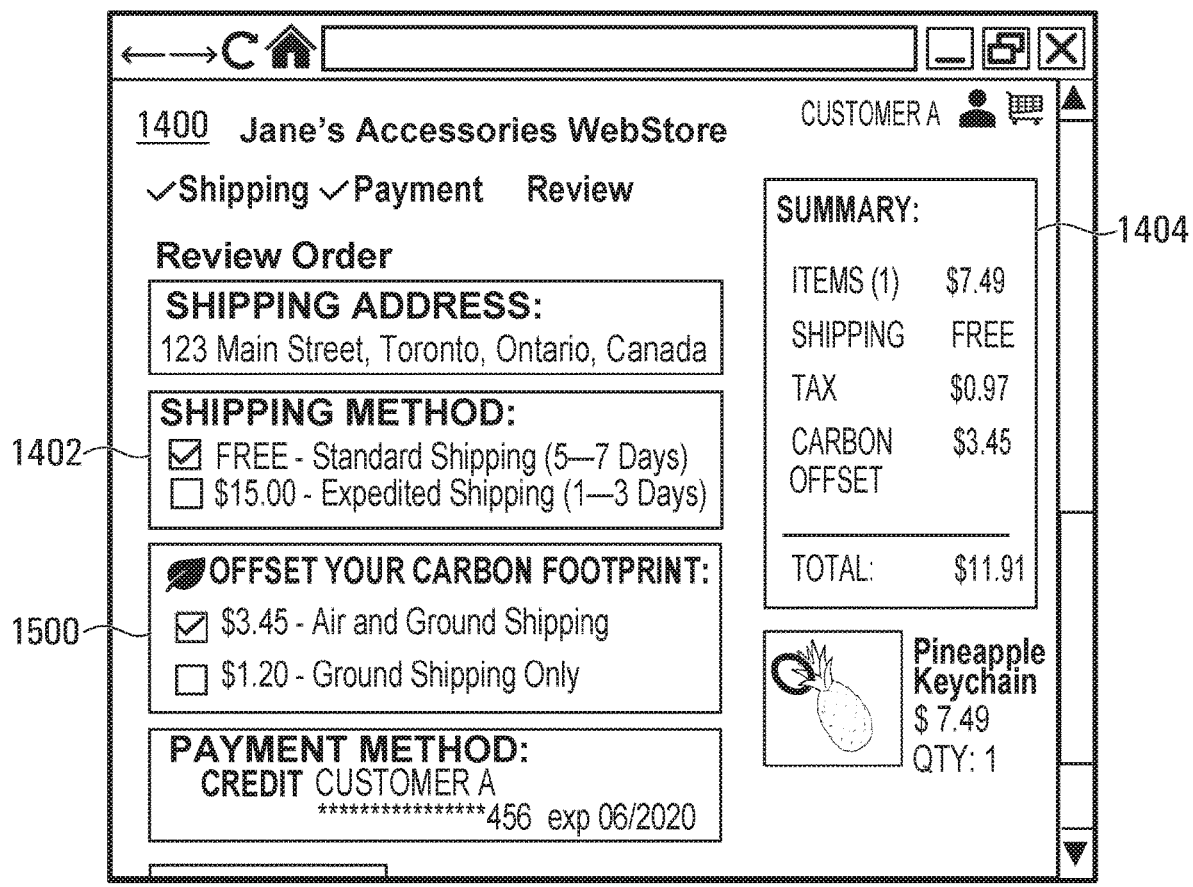

FIG. 16 is a variation of checkout page 1400, in which the customer is able to select the method of transport used to ship a package containing the purchased item. In checkout page 1400, Customer A selects standard shipping as the shipping method 1402 and is presented options with different shipping routes having respective different carbon emission indications (in the form of monetary values), as shown at 1500. Customer A may choose for a package containing the "Pineapple Keychain" to be transported to their delivery address using both air and ground shipping or by ground shipping only. The carbon offset value of each shipping method is calculated based on a carbon offset calculation model 313, such as model 1100. Because the "Pineapple Keychain" is to be shipped from San Francisco, USA to Toronto, Canada, there is a shipping route segment with a distance of 2500 miles ("Depart Los Angeles Depot to Arrival at Toronto Depot"), as shown in models 700, 800, and 1000. Model 600 indicates that either a train or airplane may be used to transport a package for a transit distance exceeding 1000 miles. The two carbon offset values presented to Customer A in box 1500 are the values calculated using a carbon offset calculation model 313, such as model 1100, based on the different transportation mode criteria.

In some embodiments, a merchant may present, to a buyer, different shipping possibilities and their respective relative carbon emission indications, like in FIG. 16. The option of different shipping routes and/or different modes of transportation may be available from a carrier, or a merchant may use different carriers that have different shipping routes and/or different modes of transportation. Regardless of whether the user wishes to pay an additional monetary amount, the user may be able to select between or request different shipping options having different carbon emissions. For example, in FIG. 16 the user may not pay a carbon offset amount on checkout, but choose to proceed with ground shipping only because it is associated with lower carbon emissions, even though shipping time may be increased.

The ability to predict and present different carbon emission indications associated with different transportation modes and/or different shipping routes may also apply in browsing scenarios prior to checkout. For example, the product page 1200 in FIG. 14 may include a message indicating that ground shipping is available and that purchasing the product is a "green choice" if ground shipping is selected. The message may further indicate that purchasing the product is not a green choice if shipping by air is selected, but that there is the ability to offset the carbon by making a donation at checkout. The messages may be generated by predicting the carbon offset value for each different available shipping route/transportation mode based on the user-specific information (such as their delivery address).

Additional Variations and Methods in addition to or instead of the embodiments above, a machine learning algorithm may be trained on the shipping records of products already shipped and delivered, in order to learn the relationships and patterns between shipping events. A mode of transportation, distance, carrier, and/or route may be associated with each transit event during the training. Post-training, input parameters may be input into the trained machine learning algorithm (e.g. merchant, product, origin address, delivery address, etc.) to generate an output that predicts the shipping route and mode(s) of transportation. This prediction may then be used to generate the carbon emission indication. In such machine learning implementations, some of the models discussed earlier may be relationships uncovered during the training of the machine learning algorithm.

Embodiments above describe the carbon emission indication as being presented to a user browsing or checking out on a merchant's online store. However, a similar carbon emission indication may also or instead be presented to merchants when they purchase their products (or materials for their products) from suppliers or wholesalers. In that case, the merchant becomes the buyer and the supplier or wholesaler becomes the merchant in terms of the discussion above. Also, in other embodiments, a merchant may use their merchant device 320 to query the carbon offset predictor 302 to obtain a carbon emission indication associated with shipping one or more of their products to one or more particular customers. The merchant could potentially offer to provide a carbon offset on behalf of the customer or as a gift to certain loyal customers, e.g. if the customer spends over a certain amount the merchant will provide a donation to a non-profit group that provides carbon sequestering.

In some embodiments, an indication of the carbon emissions associated with alternative or related products may be obtained and that also possibly displayed to the user. For example, if a "Pineapple Keychain" (or something similar) is sold by another merchant and has a lower associated carbon footprint for shipping to the user, then this may be surfaced and presented to the user. In some embodiments, related goods (e.g. goods commonly bought together) may be presented to the user if it is determined that such goods would not increase (or significantly increase) the carbon emissions associated with shipping to the user. For example, if a "Pineapple Keychain" is commonly bought with "Banana coin holder" and both products could be shipped in a package having the same size as the package used to ship either one by itself, then the user may be presented with the suggestion to consider "Banana coin holder". A message to the user may explain that shipping the "Banana coin holder" would not significantly increase the carbon emissions associated with shipping. In some embodiments, a user may purchase a product in bulk if it assists with reducing (on a per unit basis) the carbon emissions associated with shipping the bulk product. The carbon offset predictor 302 may determine if multiple instances of the product can be shipped in an efficient way (e.g. such as in a same sized package also used to ship one instance of the product), and indicate this to the user.

In some embodiments, the carbon offset value and/or carbon emission indication may be based on other factors not explicitly discussed above, e.g. standard measurements for sizes of each transport vehicle compared against the measurement of a package to determine a certain capacity of the vehicle occupied by the package.

Figure 17:
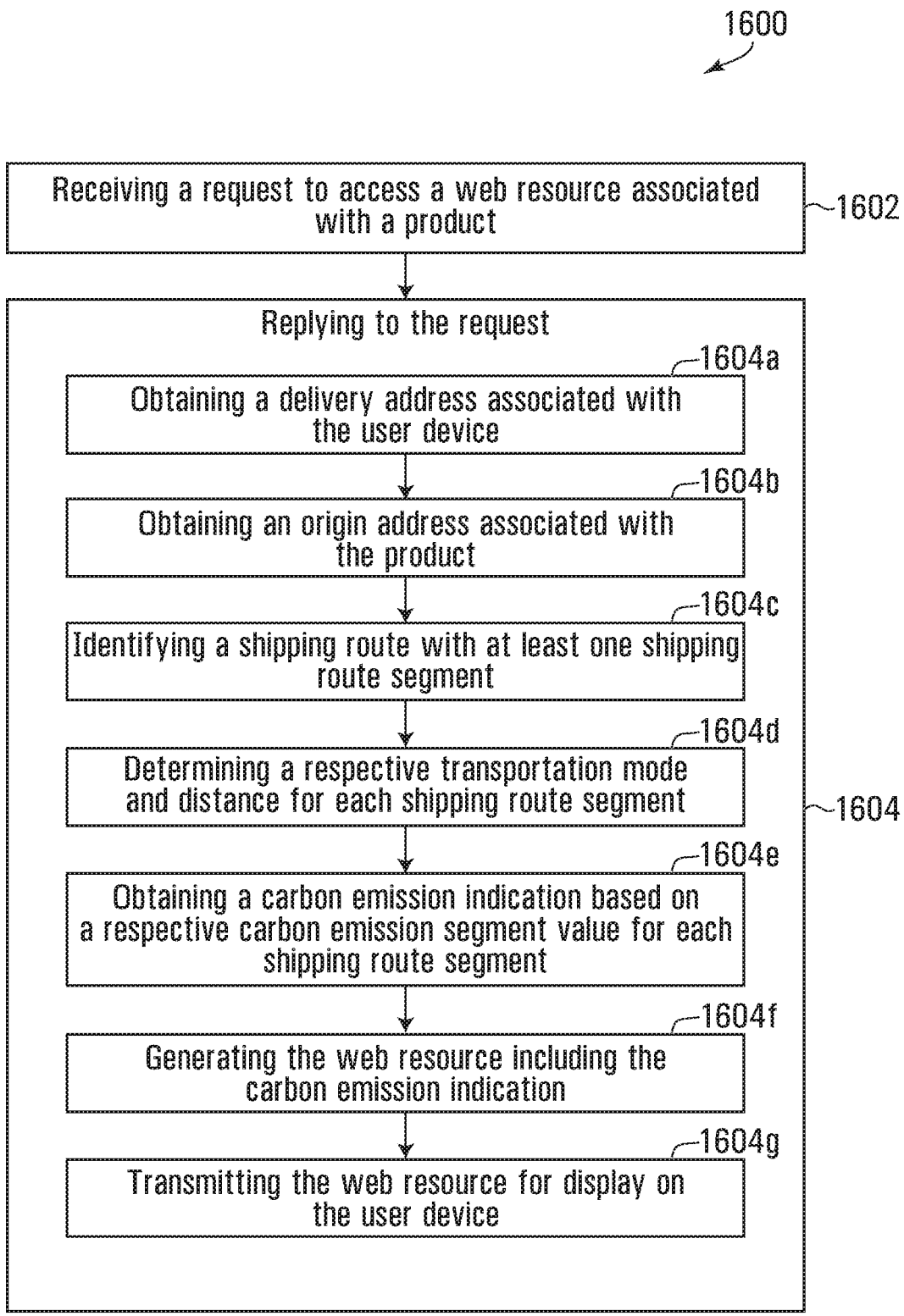

FIG. 17 illustrates a computer-implemented method 1600, according to one embodiment. The method may be performed by a computing device (e.g. a processor or combination of processors such as the processor 304 in carbon offset predictor 302). The method will be described as being performed in carbon offset predictor 302 of FIG. 4, but this is not necessary. For example, the method may instead be performed by another entity, which might or might not be part of an e-commerce platform.

At step 1602 of FIG. 17, the network interface 306 of the carbon offset predictor 302 receives a request for a web resource associated with a product in an online store. The request is received from a user device over a network. For example, the carbon offset predictor 302 may receive a request from a user device, such as user device 330, for a product web page for a product sold in an online store, such as the "Pineapple Keychain" sold in Jane's Accessories WebStore, as illustrated in FIGS. 13 and 14. In this example, the web resource is the product page illustrated in FIG. 13 or 14.

At step 1604, the processor 304 of the carbon offset predictor 302 replies to the request.

The replying to the request first includes sub-step 1604a, in which the processor 304 obtains a delivery address associated with the user device 330. As previously described, the delivery address associated with the user device may be determined based on data stored within a saved customer/user profile associated with the user device. Alternatively, in some other embodiments the carbon offset predictor 302 may request access to the location of the user device 330 to predict or estimate the delivery address. In other embodiments, the user of the user device 330 may be viewing the merchant's online store using a browser with a stored profile including the user's delivery address, or the delivery address may be manually input into the user device 330 by the user and transmitted to the carbon offset predictor 302, e.g. in response to a prompt.

In sub-step 1604b of the replying step 1604, the processor 304 of the carbon offset predictor 302 obtains an origin address associated with the product. For example, the carbon offset predictor 302 may determine the origin address of the "Pineapple Keychain" for sale in Jane's Accessories WebStore based on past shipping records for products shipped from Jane's Accessories WebStore, or from other information provided by Merchant Jane, e.g. based on stock inventory locations previously provided by Merchant Jane. As illustrated in FIGS. 13 and 14, Jane's Accessories WebStore is located in San Francisco, USA. That is, the address associated with Merchant Jane is in San Francisco. In some embodiments, the origin address of a product is the address associated with the merchant selling that product.

In sub-step 1604c of the replying step 1604, the processor 304 of the carbon offset predictor 302 identifies a shipping route with at least one shipping route segment for shipping the product from the origin address to the delivery address. In some embodiments, the identified shipping route segment (s) might not include the package's entire shipping route. For instance, the carbon offset value might only be calculated between major hubs, e.g. the "last mile" when the delivery truck drops off the package at the delivery address may be excluded. For example, if Customer A, whose delivery address is in Toronto, Canada, is viewing the product web page of the "Pineapple Keychain" in Jane's Accessory WebStore, the carbon offset predictor 302 may identify a shipping route from San Francisco, USA to Toronto, Canada using carrier models 309, such as the model of FIG. 6. The identified shipping route may include shipping route segments such as "Depart San Francisco Depot" to "Arrive at Los Angeles Dept". The shipping route might exclude some segments of the actual shipping, e.g. the pickup and/or delivery segments.

In sub-step 1604d of the replying step 1604, the processor 304 of the carbon offset predictor 302 determines a respective transportation mode and distance for each shipping route segment of the shipping route. Carrier models 309, such as the models of FIGS. 7 to 9, may be used to predict the transportation mode of a particular segment of the shipping route based on the distance between locations at which shipping events occur and possibly other characteristics relating to the package being shipped (e.g. mail class, package weight, etc.). For instance, the carbon offset predictor 302 may determine that the relevant carrier model for the predicted carrier of the "Pineapple Keychain" for sale in Jane's Accessories WebStore is FedEx Priority, such that model 1000 of FIG. 11 may be used to predict the transportation mode of the shipping route segments of the identified shipping route. As per FIG. 11, the shipping route segment "Depart San Francisco Depot to Arrival at Los Angeles Depot" is determined to span 380 miles. Based on a carrier model 309, such as model 600 of FIG. 7, a shipping route segment with a transit distance between 60 miles and 1000 miles is predicted to use a transport truck for transporting the package.

In sub-step 1604e of the replying step 1604, the processor 304 of the carbon offset predictor 302 obtains a carbon emission indication based on a respective carbon emission segment value for each shipping route segment of the shipping route. The carbon emission segment value for a given shipping route segment may be based on the transportation mode and/or the distance associated with the given shipping route segment. In some embodiments, the carbon emission indication may be determined as a monetary value that is based on (e.g. a sum of) monetary carbon emission segment values. The carbon emission segment values may be determined by a carbon offset calculation model 313 in memory 308 of the carbon offset predictor 302, such as model 1100 of FIG. 12. For example, the carbon emission segment value for the shipping route segment "Depart San Francisco Depot to Arrival at Los Angeles Depot" for the "Pineapple Keychain" may be calculated to be 15.2 cents, as the shipping route segment involves the shipping of the package 380 miles by transport truck. Based on model 1100, the associated cost of this shipping segment is 380 miles× 0.04 cent/mile=15.2 cents. In some embodiments, the carbon emission indication might not be a monetary value, but may instead be other web content, e.g. another value or message or image, that is based on the carbon emission segment values. For example, the carbon emission indication may be a message indicating that shipment of the package is a "green choice" when the sum of the carbon emission segment values is below a defined threshold.

In sub-step 1604f of the replying step 1604, the processor 304 of the carbon offset predictor 302 generates the web resource, which includes the carbon emission indication, and in sub-step 1604g, the web resource is transmitted over the network by network interface 306 for display on the user device 330. The user may view the web resource through a display 339 of the user interface 338 of the user device 330. For example, the customer may request the product web page for the "Pineapple Keychain" in Jane's Accessories WebStore, as illustrated in the UIs of FIGS. 13 and 14. The carbon emission indication may be provided to the customer in the form of a message and/or a monetary carbon offset amount associated with shipping the product to a known delivery address. An example is indication 1204 of FIG. 13, which states "Offsetting the shipping of this product to Customer A is $3.45 for standard shipping". The carbon emission indication may alternatively indicate that shipment of the "Pineapple Keychain" shown on the product web page is a "Green Choice", as illustrated in FIG. 14. In some embodiments, the carbon emission indication may be in the form of web content such as text and/or image content, e.g. that indicates that shipment of the product is an eco-conscious decision.

In some embodiments of the method of FIG. 17, the web resource includes the carbon emission indication in addition to an indication of a purchase price for the product. In some embodiments, subsequent to transmitting the web resource, the method also includes receiving, from the user device 330, an authorization message to complete a transaction for the product. For example, a checkout page for an online store, such as the checkout page 1400 for Jane's Accessories WebStore, may include a carbon emission indication such as indication 1406 or 1500 in addition to the price of the product, which is listed in the purchase summary 1404. In order to complete the transaction, the customer must authorize the transaction by clicking the submit order button on the checkout page, which is presented on display 339 of the user interface 338 of the user device 330.

In some embodiments of the method of FIG. 17, the web resource is a function associated with an online purchase of the product, e.g. an add-to-cart or checkout-related function. For example, the web resource may be the function "proceed to checkout". When the "proceed to checkout" action occurs checkout-related information (e.g. a checkout summary or webpage) is generated to include a carbon emission indication for the product.

As mentioned above, in some embodiments the web resource may also include the carbon emission indication in addition to an indication of a purchase price for the product. In such embodiments, the method may also include receiving, from the user device 330, an indication to add a carbon emission offset value to the purchase price, and in response to receiving the indication, transmitting an adjusted purchase price including a sum of the carbon emission offset value and the purchase price. The customer may provide the indication through the use of a user interface 338 on a user device 330, which instructs the processor 304 of the carbon offset predictor 302 to adjust the purchase price. For example, the checkout page 1400 of FIGS. 15 and 16 may include a carbon emission indication 1406 or 1500, and allow the customer to select whether to add the carbon emission value specified by the indication to the total purchase price, as shown in the purchase summary section 1404.

In some embodiments of the method of FIG. 17, the web resource is a product web page or a checkout web page for the product. For instance, the web resource may be a product web page, such as product web page 1200 of FIGS. 13 and 14 for a "Pineapple Keychain" in Jane's Accessories WebStore. Alternatively, the web resource may be a checkout page in an online store, such as checkout page 1400 of FIGS. 15 and 16 where a customer is purchasing items from Jane's Accessories WebStore. The product web page or the checkout page may be presented to the customer through the display 339 within the user interface 338 of a user device 330.

In some embodiments of the method of FIG. 17, a plurality of shipping routes is identified for shipping the product from the origin address to the delivery address, and a web resource includes a respective carbon emission indication for each one of the plurality of shipping routes. In some embodiments, subsequent to transmitting the web resource, the method of FIG. 17 may also include receiving, from the user device 330, a message selecting one of the plurality of shipping routes. For instance, the carbon offset predictor 302 may predict alternative possible shipping routes associated with shipping a package from a particular origin address to a particular delivery address. The alternative shipping routes may be determined using any one or more of the carrier models 309 models illustrated by FIGS. 6 to 11. The carbon emission amount respectively associated with each shipping route may be determined using a carbon offset calculation model 313, such as the model illustrated in FIG. 12. An indication of the carbon emission associated with each route may be provided to the display 339 of the user interface 338 of a user device 330. The customer may then select one of the shipping routes. As an example, the checkout page 1400 of FIG. 16 provides an indication 1500 that allows the customer to select a preferred method of shipping. The customer is able to select a shipping route that transports the package using both air and ground shipping or a route that uses ground shipping only. Each route is associated with a respective carbon emission indication ($3.45 vs. $1.20). In some embodiments, at least two of the plurality of shipping routes are associated with different carriers. For example, the option of ground shipping only in FIG. 16 may be based on a first shipping route predicted using a model for a first carrier, and the option of air and ground shipping may be based on a second shipping route predicted using a model for a second carrier.

In some embodiments, determining the respective transportation mode for each shipping route segment, as in sub-step 1604d of the method of FIG. 17, includes selecting the respective transportation mode, for a particular shipping route segment, based on a transit time associated with the particular shipping route segment and/or based on the distance associated with the particular shipping route segment. For example, model 600 of FIG. 7 predicts a mode of transportation 606 based on the transit distance 602 and the average transit time 604 of a shipping route segment. The shipping route segment "Depart San Francisco Depot to Arrival at Los Angeles Depot" is predicted to be transported by a transport truck, as the distance between the two depots is 380 miles, which falls between the range of 60 miles to 1000 miles indicated by model 600.

In some embodiments, the sub-step 1604e of the method of FIG. 17 includes determining the respective carbon emission segment value for each shipping route segment by performing operations including multiplying, for a particular shipping route segment, the distance associated with the particular shipping route segment by a unit cost that is dependent upon the transportation mode and/or a package characteristic. One example of a package characteristic is a weight of the package. Other examples of package characteristics may include size of the package and/or shipping service level (mail class) for shipping the package. For example, the shipping route segment "Depart San Francisco Depot to Arrival at Los Angeles Depot" may involve shipping a package by transport truck for 380 miles. Based on a carbon offset calculation model 313, such as model 1100 of FIG. 12, transporting a package less than 30 pounds by transport truck has a carbon offset amount of 0.04 cents/mile. The processor 304 of the carbon offset predictor 302 then determines that the carbon emission segment value for this shipping route segment is 380 miles×0.04 cents/mile=15.2 cents.

In some embodiments, the carbon emission indication is a sum of each respective carbon emission segment value. For instance, the carbon emission indication $3.45 presented to the customer on product page 1200 of FIG. 13 is the sum of all of the carbon emission segment values of a predicted shipping route for the "Pineapple Keychain" from San Francisco, USA to Toronto, Canada. The value of $3.45 is the sum of the carbon emission segment values calculated based on the shipping route segments illustrated in model 1000 of FIG. 11 and using model 1100 of FIG. 12.

In some embodiments, the shipping route may be a first shipping route and the carbon emission indication may be a first carbon emission indication. The method of FIG. 17 in such implementations may also include: determining a second shipping route for the product based on the origin address and the delivery address; obtaining a second carbon emission indication based on the transportation mode and the distance associated with each of one or more shipping route segments of the second shipping route; and, transmitting the second carbon emission indication over the network for display on the user device concurrently with the first carbon emission indication. For example, FIG. 16 illustrates a checkout page 1400 with a section 1500 that concurrently displays two carbon emission indications reflective of two shipping routes. Here, the first shipping route involves shipping the package using both air and ground transportation with an associated offset amount of $3.45. A second shipping route is offered where the package is shipped using ground transportation only with an associated offset amount of $1.20.

In some embodiments, step 1604 of method 1600 of FIG. 17 further includes predicting a carrier based on a merchant account associated with the product and/or based on one or more of: the product, the origin address, the delivery address, and/or a selected shipping service level. As well, sub-step 1604c may further include: retrieving a model for the carrier from memory, where the model may store a plurality of shipping routes, and selecting the shipping route as one of the plurality of shipping routes based on at least the origin address and the delivery address. For instance, a carrier model 309 in the memory 308 of the carbon offset predictor 302 may map products for sale in Merchant Jane's WebStore to a predicted carrier, as illustrated by model 900 in FIG. 10. The product "Pineapple Keychain" is predicted to be shipped by USPS when "Regular" shipping service is selected 904 and the delivery address is in the USA. However, when the delivery address is in Canada or "Expedited" shipping service is selected, the predicted carrier is FedEx.

In some embodiments, the method of FIG. 17 may include generating a model for a carrier by analyzing shipping records for packages previously shipped by the carrier in order to document different possible shipping routes. This may be performed in non-real time, and it may be performed prior to step 1602. The carrier model might or might not be associated with a particular merchant. For instance, generating a carrier model associated with Jane's Accessories WebStore may involve analyzing shipping records for past orders, such as completed shipping records 311 stored in memory 308 of the carbon offset predictor 302, which may include completed shipping record 400 of FIG. 5.

In some embodiments, the shipping route may be a predicted shipping route, and the method 1600 of FIG. 17 may further include tracking an actual shipping route taken by the carrier to deliver the product to the delivery address. In some embodiments, if it is determined that the actual shipping route is different from the predicted shipping route, then in response the carrier model may be updated. For example, a package containing the "Pineapple Keychain" may be shipped from San Francisco, USA to Toronto, Canada using FedEx Regular shipping. The predicted shipping route may be a shipping route determined by an existing carrier model 309, such as model 800 of FIG. 9. The predicted shipping route routes the package through Los Angeles. However, if the package is instead actually shipped directly from the San Francisco depot to the Toronto depot, it will be determined that the actual shipping route is different from the predicted shipping route. Based on this observation, the corresponding carrier model 309 may be updated in order to incorporate this new shipping route information.

In some embodiments, a system is provided for performing the methods described above. The system may include a memory (e.g. memory 308) to store information such as carrier models. The system may further include at least one processor (e.g. processor 304) to perform operations such as preparing a reply to a request for a web resource, including generating and incorporating a carbon emission indication. The system may further include a network interface (e.g. network interface 306) for receiving the request for the web resource and transmitting the reply. In some embodiments, a computer-readable medium is provided having stored thereon computer-executable instructions that, when executed by a computer, cause the at least one computer to perform method steps described above.

Conclusion

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
   receiving, from a user device over a network, a request for a web page associated with a product in an online store, the request originating at the user device during browsing of or checkout from the online store by the user device prior to completion of purchase of the product; and
   replying to the request to provide the web page within a timing constraint associated with providing the web page during a user's real-time online interaction with the online store, the replying including performing at least the following operations for generation and transmission of the web page:
      obtaining a delivery address of the product responsive to the request, the delivery address associated with the user device;
      obtaining an origin address associated with the product responsive to the request;
      identifying a shipping route associated with the user device, the shipping route corresponding to a carrier and the shipping route for shipping the product, by the carrier, from the origin address to the delivery address, the shipping route having at least one shipping route segment;
      determining a respective transportation mode used by the carrier during shipment of the product and distance for each shipping route segment of the shipping route along which the carrier ships the product;
      obtaining a carbon emission indication based on a respective carbon emission segment value for each shipping route segment of the shipping route along which the carrier ships the product and based on a machine learning algorithm trained on shipping records of products already shipped and delivered, wherein the respective carbon emission segment value for a given shipping route segment is based on the transportation mode used by the carrier and the distance associated with the given shipping route segment;
      generating the web page, the generated web page including the carbon emission indication; and
      transmitting the web page over the network for display on the user device.

2. The computer-implemented method of claim 1, wherein the web page includes the carbon emission indication in addition to an indication of a purchase price for the product, and wherein the method further comprises:
   subsequent to transmitting the web page: receiving, from the user device, an authorization message to complete a transaction for the product.

3. The computer-implemented method of claim 1, wherein the web page is associated with an online purchase of the product.

4. The computer-implemented method of claim 1, wherein the web page is a product web page or a checkout web page for the product.

5. The computer-implemented method of claim 1, wherein a plurality of shipping routes are identified for shipping the product from the origin address to the delivery address, wherein the web page includes a respective carbon emission indication for each one of the plurality of shipping routes, and wherein the method further comprises:
   subsequent to transmitting the web page: receiving, from the user device, a message selecting one of the plurality of shipping routes.

6. The computer-implemented method of claim 1, wherein determining the respective transportation mode for each shipping route segment comprises:
   for a particular shipping route segment: selecting the respective transportation mode based on a transit time associated with the particular shipping route segment and/or based on the distance associated with the particular shipping route segment.

7. The computer-implemented method of claim 1, comprising determining the respective carbon emission segment value for each shipping route segment by performing operations including:
   for a particular shipping route segment: multiplying the distance associated with the particular shipping route segment by a unit cost that is dependent upon both the transportation mode and a package characteristic.

8. The computer-implemented method of claim 1, wherein replying to the request further comprises predicting a carrier based on a merchant account associated with the product and also based on one or more of: the product, the origin address, the delivery address, and/or a selected shipping service level; and wherein identifying the shipping route comprises retrieving a model for the carrier from memory, the model storing a plurality of shipping routes, and selecting the shipping route as one of the plurality of shipping routes based on at least the origin address and the delivery address.

9. The computer-implemented method of claim 8, further comprising generating the model for the carrier by analyzing shipping records for packages previously shipped by the carrier in order to document different possible shipping routes.

10. The computer-implemented method of claim 8, wherein the shipping route is a predicted shipping route, and wherein the method further comprises:
    tracking an actual shipping route taken by the carrier to deliver the product to the delivery address; and
    determining that the actual shipping route is different from the predicted shipping route, and in response updating the carrier model.

11. A system comprising:
    a network interface to receive, from a user device over a network, a request for a web page associated with a product in an online store, the request originating at the user device during browsing of or checkout from the online store by the user device prior to completion of purchase of the product;
    at least one processor to reply to the request to provide the web page within a timing constraint associated with providing the web page during a user's real-time online interaction with the online store, the replying including performing at least the following operations for generation and transmission of the web page:
       obtaining a delivery address of the product responsive to the request, the delivery address associated with the user device;
       obtaining an origin address associated with the product responsive to the request;
       identifying a shipping route associated with the user device, the shipping route corresponding to a carrier and the shipping route for shipping the product, by the carrier, from the origin address to the delivery address, the shipping route having at least one shipping route segment;

determining a respective transportation mode used by the carrier during shipment of the product and distance for each shipping route segment of the shipping route along which the carrier ships the product;

obtaining a carbon emission indication based on a respective carbon emission segment value for each shipping route segment of the shipping route along which the carrier ships the product and based on a machine learning algorithm trained on shipping records of products already shipped and delivered, wherein the respective carbon emission segment value for a given shipping route segment is based on the transportation mode used by the carrier and the distance associated with the given shipping route segment; and generating the web page, the generated web page including the carbon emission indication;

the network interface further to transmit the web page over the network for display on the user device.

12. The system of claim 11, wherein the web page includes the carbon emission indication in addition to an indication of a purchase price for the product, and wherein the at least one processor is further to:

receive, from the user device, an authorization message to complete a transaction for the product subsequent to transmission of the web page.

13. The system of claim 11, wherein the web page is associated with an online purchase of the product.

14. The system of claim 11, wherein the web page is a product web page or a checkout web page for the product.

15. The system of claim 11, wherein the at least one processor is to identify a plurality of shipping routes for shipping the product from the origin address to the delivery address, wherein the web page includes a respective carbon emission indication for each one of the plurality of shipping routes, and wherein the at least one processor is further to:

receive, from the user device, a message selecting one of the plurality of shipping routes subsequent to transmission of the web page.

16. The system of claim 11, wherein the at least one processor is to determine the respective transportation mode for each shipping route segment by performing operations including:

for a particular shipping route segment: selecting the respective transportation mode based on a transit time associated with the particular shipping route segment and/or based on the distance associated with the particular shipping route segment.

17. The system of claim 11, wherein the at least one processor is to determine the respective carbon emission segment value for each shipping route segment by performing operations including:

for a particular shipping route segment: multiplying the distance associated with the particular shipping route segment by a unit cost that is dependent upon both the transportation mode and a package characteristic.

18. The system of claim 11, wherein the at least one processor is to prepare the reply to the request by performing operations further including predicting a carrier based on a merchant account associated with the product and also based on one or more of: the product, the origin address, the delivery address, and/or a selected shipping service level; and wherein the at least one processor is to identify the shipping route by performing operations including retrieving a model for the carrier from memory, the model storing a plurality of shipping routes, and selecting the shipping route as one of the plurality of shipping routes based on at least the origin address and the delivery address.

19. The system of claim 18, wherein the at least one processor is further to generate the model for the carrier by analyzing shipping records for packages previously shipped by the carrier in order to document different possible shipping routes.

20. The system of claim 18, wherein the shipping route is a predicted shipping route, and wherein the at least one processor is to:

track an actual shipping route taken by the carrier to deliver the product to the delivery address; and update the carrier model in response to determining that the actual shipping route is different from the predicted shipping route.

21. A non-transitory computer-readable medium having stored thereon computer-executable instructions that, when executed by a computer, cause the computer to perform operations comprising:

receiving, from a user device over a network, a request for a web page associated with a product in an online store, the request originating at the user device during browsing of or checkout from the online store by the user device prior to completion of purchase of the product; and replying to the request to provide the web page within a timing constraint associated with providing the web page during a user's real-time online interaction with the online store, the replying including performing at least the following operations for generation and transmission of the web page:

obtaining a delivery address of the product responsive to the request, the delivery address associated with the user device;

obtaining an origin address associated with the product responsive to the request;

identifying a shipping route associated with the user device, the shipping route corresponding to a carrier and the shipping route for shipping the product, by the carrier, from the origin address to the delivery address, the shipping route having at least one shipping route segment;

determining a respective transportation mode used by the carrier during shipment of the product and distance for each shipping route segment of the shipping route along which the carrier ships the product;

obtaining a carbon emission indication based on a respective carbon emission segment value for each shipping route segment of the shipping route along which the carrier ships the product and based on a machine learning algorithm trained on shipping records of products already shipped and delivered, wherein the respective carbon emission segment value for a given shipping route segment is based on the transportation mode used by the carrier and the distance associated with the given shipping route segment;

generating the web page, the generated web page including the carbon emission indication; and transmitting the web page over the network for display on the user device.

* * * * *